United States Patent [19]

Morikawa et al.

[11] Patent Number: 5,909,565
[45] Date of Patent: Jun. 1, 1999

[54] MICROPROCESSOR SYSTEM WHICH EFFICIENTLY SHARES REGISTER DATA BETWEEN A MAIN PROCESSOR AND A COPROCESSOR

[75] Inventors: Toru Morikawa, Suita; Nobuo Higaki, Osaka; Shinya Miyaji, Nara, all of Japan

[73] Assignee: Matsushita Electric Industrial Co., Ltd., Kadoma, Japan

[21] Appl. No.: 08/625,627

[22] Filed: Mar. 29, 1996

[30] Foreign Application Priority Data

Apr. 28, 1995 [JP] Japan .................................. 7-106624

[51] Int. Cl.⁶ .................................................. G06F 15/16
[52] U.S. Cl. ............. 395/376; 395/200.38; 395/200.43; 395/800.33; 395/800.34; 395/733; 395/739
[58] Field of Search ................................... 395/376, 800, 395/200.05, 200.12, 280, 290, 733, 736–737, 739, 800.31–800.34, 200.38, 200.43, 200.57

[56] References Cited

U.S. PATENT DOCUMENTS

| | | | |
|---|---|---|---|
| 4,547,849 | 10/1985 | Louie et al. ............................. | 395/823 |
| 4,758,950 | 7/1988 | Cruess et al. ........................... | 395/742 |
| 4,942,519 | 7/1990 | Nakayama .............................. | 395/290 |
| 4,949,241 | 8/1990 | Iwasaki et al. ......................... | 395/290 |
| 4,979,102 | 12/1990 | Tokuume ............................ | 395/200.43 |
| 5,119,499 | 6/1992 | Tonomura et al. ................ | 395/800.34 |
| 5,655,131 | 8/1997 | Davies ............................... | 395/800.34 |

FOREIGN PATENT DOCUMENTS

| | | |
|---|---|---|
| 526911 | 2/1993 | European Pat. Off. . |
| 1240932 | 9/1989 | Japan . |
| 1243167 | 9/1989 | Japan . |
| 652521 | 7/1994 | Japan . |

OTHER PUBLICATIONS

"Coprocessors Speed Floating Point Calculations", by M. Gavrielov et al., 8167 Computer Design, vol. 22(1983) Oct., No. 11.

"Design and Performance of the IBM Enterprise System/9000 Type 9121 Vector Facility", by T.J. Siegel et al., IBM Journal of Research & Development, 35(1991)May, No. 3.

The T800: A 32 Bit, 10 MIP Transputer with on Chip Floating Point Hardware, by S. Roe, 8079 Electro/87 and Mini/Micro Northeast 12 (1987) Conference Record, Los Angeles, CA.

"A Fast Floating Point Unit in the i960 General–Purpose Embedded Processor Family," by A. Bajwa et al., 8080 Wescon Conference Record, 34(1990)Nov., North Hollywood, CA.

*Primary Examiner*—Parshotam S. Lall
*Assistant Examiner*—Bharat Barot
*Attorney, Agent, or Firm*—Price,Gess & Ubell

[57] ABSTRACT

An information processing device, including a main processor and a coprocessor for processing data according to instructions stored in memory, which is composed of an instruction bus for transmitting instructions from memory to the main processor and coprocessor; a first bus used for transmitting data from the main processor to the coprocessor; a second bus used for transmitting data from the coprocessor to the main processor; instruction detecting means for detecting coprocessor calculation instructions out of the instructions received from memory; operand identifying means for identifying source registers and destination registers specified by operands in a detected instruction; data supplying means for supplying data from the identified source registers to the coprocessor via the first bus; data storing means for storing coprocessor calculation results in the identified destination registers; coprocessor instruction detecting means for detecting coprocessor calculation instructions out of all of the instructions received from the memory; and coprocessor instruction executing means for executing the coprocessor calculation instructions detected by the coprocessor instruction detecting means using data supplied by the first bus and for supplying the calculation result on the second bus.

23 Claims, 11 Drawing Sheets

FIG. 2

| MNEMONIC | INSTRUCTION CODE | OPERATION |
|---|---|---|
| MULQ Dm,Dn | F60X(H)<br>↑— SOURCE, DESTINATION | Dm × Dn<br>→Dn(lower32),MR |
| MULQ imm8,Dn | F90XXX(H)<br>↑— imm8<br>↑— SOURCE, DESTINATION | (imm8 CODE EXPANSION) × Dn<br>→Dn(lower32),MR(upper32) |
| MULQ imm16,Dn | FB0XXXXX(H)<br>↑— imm16<br>↑— SOURCE, DESTINATION | (imm16 CODE EXPANSION) × Dn<br>→Dn(lower32),MR(upper32) |
| MULQ imm32,Dn | FD0XXXXXXXXX(H)<br>↑— imm32<br>↑— SOURCE, DESTINATION | (imm32 CODE EXPANSION) × Dn<br>→Dn(lower32),MR(upper32) |

MICROPROCESSOR SYSTEM WHICH EFFICIENTLY SHARES REGISTER DATA BETWEEN A MAIN PROCESSOR AND A COPROCESSOR

BACKGROUND OF THE INVENTION

1. Field of the Invention

The present invention relates to an information processing device which is made up of a main data processing device (main processor) and a sub expansion processing device (coprocessor) for processing data according to instructions stored in a memory.

2. Description of the Related Art

In recent years, great improvements have been made in processing power by equipping data processing devices (hereinafter, "processors") with expansion computational devices (hereinafter, "coprocessors") which, according to necessity, execute special calculations at high speed.

The main conventional methods for providing such coprocessors consist of the installation of the coprocessor inside the main processor and of the connection of a coprocessor to the main processor according to necessity. Of these, the former installation method has the drawbacks of increases in cost and in power consumption when the coprocessor is not being used, so that a method for connecting a coprocessor which is equal in performance to an installed coprocessor is desired.

Conventional information processing devices which include a coprocessor connected to the main processor operate so that coprocessor calculations are performed by the processor decoding instructions for the coprocessor and then informing the coprocessor of the decoded commands. This method has a drawback in that the transfer of commands from the processor generates considerable overheads which makes the processing time taken by the coprocessor too long.

In response to this problem, Japanese Laid-Open Patent Application 1-240932 discloses an information processing device which, by having a coprocessor take and decode a same instruction at the same time as a processor which executes pipeline processing, can achieve a reduction in the time needed for command transfer and decoding.

However, when coprocessors in such conventional information processing devices execute processing using the data held in the general registers of the main processor, or when data processed by the coprocessor is stored in the general registers in the main processor, the data first has to be temporarily stored in the memory, with this transfer of data to the memory increasing execution time and thereby reducing the performance of the system.

Similarly, when coprocessors in such conventional information processing devices execute processing using the flag information held in the flag storage registers in the main processor or when flag information processed by the coprocessor is stored in the flag storage registers in the main processor, the flag information first has to be temporarily stored in the memory, with this transfer of flag information to the memory increasing execution time and thereby reducing the performance of the system.

Also, when data processed by the coprocessor and flag information processed by the coprocessor is stored in the flag storage registers and general registers in the main processor, it is necessary for the main processor to lock pipeline processing until the storage of the data and flag information in the general registers or flag storage registers is complete, which increases execution time and thereby reduces the performance of the system.

Similarly, when an interruption process arises during the processing of the coprocessor, since the data currently being processed cannot be stored, it becomes necessary for the coprocessor to reexecute the processing of the data after the interruption process has been completed. This increases execution time and thereby reduces the performance of the system.

Finally, when an task switching process arises during the processing of the coprocessor, since the data currently being processed cannot be stored, it becomes necessary for the coprocessor to reexecute the processing of the task process executed before task switching. This increases execution time and thereby reduces the performance of the system.

SUMMARY OF THE INVENTION

The first object of the present invention is to provide an information processing device which, when executing coprocessor instructions using data in the general registers of the main processor or when storing data processed by the coprocessor in the general registers of the main processor, does not cause an increase in execution time.

The second object of the present invention is to provide an information processing device which, when executing coprocessors for different kinds of calculation can be easily added or removed according to necessity.

The third object of the present invention is to provide an information processing device when executing coprocessor instructions using data in the general registers of the main processor or when storing data processed by the coprocessor in the general registers of the main processor, can execute processing at high speed without disorder in the pipeline processing of the main processor.

The fourth object of the present invention is to provide an information processing device which, when executing coprocessor instructions using flag information in the flag storage registers of the main processor or when storing flag information processed by the coprocessor in the general register of the main processor, does not cause an increase in execution time and a drop in performance.

The fifth object of the present invention is to provide an information processing device which can suppress an increase in cost due to increased circuit size or an increase in power consumption when a coprocessor executes processing using a plurality of operands.

The sixth object of the present invention is to provide an information processing device which can suppress an increase in execution time and a drop in performance when an interruption process occurs during coprocessor processing.

The seventh object of the present invention is to provide an information processing device which can suppress an increase in execution time and a drop in performance when a task switching process occurs during coprocessor processing.

The first object of the present invention by an information processing device which includes a main processor and a coprocessor which process data according to an instruction stored in a memory, said information processing device comprising: an instruction bus used for transmitting the instruction from the memory to the main processor and to the coprocessor; a first bus used for transmitting data from the main processor to the coprocessor; a second bus used for transmitting data from the coprocessor to the main processor; an instruction detecting unit, installed in the main processor, for detecting a coprocessor calculation instruction which is an instruction which should be executed by the coprocessor, out of all of the instructions received from the memory via the instruction bus; an operand identifying unit, installed in the main processor, for identifying source registers and destination registers specified by operands in the instruction detected by the instruction detection unit; a data supplying unit, installed in the main processor, for supplying data from the identified source registers to the coprocessor via the first bus; a data storing unit, installed in the main processor, for storing a calculation result supplied from the coprocessor via the second bus in the identified destination register; a coprocessor instruction detecting unit, installed in the coprocessor, for detecting the coprocessor calculation instruction out of all of the instructions received from the memory via the instruction bus; and a coprocessor instruction executing unit, installed in the coprocessor, for executing the coprocessor calculation instruction detected by the coprocessor instruction detecting unit using the data supplied by the first bus and for supplying the calculation result on the second bus.

By means of the above construction, it is no longer necessary to execute data transfer via the memory when the coprocessor calculates using the data in the data storage unit of the main processor or when the calculation result of the coprocessor is stored in the data storage unit since the data can be directly transferred using the first and second buses which are provided between the processor and coprocessor. This construction enables the realization of an information processing device of high processing performance.

Also, the information processing device may further comprise: at least one coprocessor, with a coprocessor calculation instruction executed by each coprocessor being for a different type of calculation, wherein the instruction bus may be used to transmit an instruction taken from the memory to the coprocessor instruction detecting unit in every coprocessor, the first bus may be used to transmit data supplied by the data supplying unit to the coprocessor instruction executing unit in each coprocessor, the second bus may be used to transmit a calculation result of the coprocessor instruction executing unit in a coprocessor which executed the coprocessor calculation instruction to the data storing unit, and the instruction detecting unit may detect coprocessor instructions for each coprocessor.

The above construction enables the realization of the second object of the present invention. This is to say, by simultaneously connecting a plurality of coprocessors, a program which contains a variety of coprocessor instructions can be executed at high speed. Also, the attachment or removal of coprocessors can be easily achieved according to necessity. In this case, there is no change in the electrical load of the internal wiring of the main processor regardless of the number of coprocessors, so that different configurations of coprocessors can be chosen freely. In particular, this makes it very easy to design the information processing device so as to be realized by one chip.

Also, the information processing device may further comprise: a main processor stage status management unit for managing a number of cycles in an instruction execution stage of the main processor so as to equal a number of execution cycles of the coprocessor instruction executing unit, wherein the main processor may execute pipeline processing which includes at least an instruction fetch stage, an instruction decoding stage and the instruction execution stage and the coprocessor may operate in synchronization with the main processor.

The above construction enables the realization of the third object of the present invention. This is to say, by managing the main processor and coprocessor so that the number of cycles in their execution stages are equal, disorder in the pipeline processing of the main processor can be avoided. Accordingly, a smooth transfer between execution of coprocessor instructions and instruction execution by the main processor can be achieved.

Also, the coprocessor instruction executing unit, on reaching a final cycle during an execution of the coprocessor instruction, may notify the main processor stage status management unit of an end of coprocessor instruction execution and the main processor stage status management unit, on receiving a notification of the end of coprocessor instruction execution, may terminate the instruction execution stage during an execution cycle in which the notification is received.

By means of the above construction, providing a signal line for transmitting the execution completion signal enables the avoidance of disorder in pipeline processing and the achievement of a smooth transfer to coprocessor instructions execution by means of a simple construction.

Also, the information processing device may further comprise a main processor determining unit for determining a number of cycles in the execution stage of a main processor in accordance with a kind of coprocessor calculation instruction detected by the instruction detecting unit, wherein the main processor stage status management unit may have the instruction execution stage continued for the number of cycles determined by the main processor determining unit.

By means of the above construction, it becomes no longer necessary to provide a signal line between the main processor and the coprocessor for giving notice of the end of coprocessor instruction execution, so that a connection method favorable to the connection of a plurality of coprocessors can be achieved.

Also, the information processing device may further comprise: a main processor flag register for storing a plurality of flags showing states of a calculation result; a first flag bus used for transmitting flags supplied by the data supplying unit to the coprocessor instruction executing unit; and a second flag bus used for transmitting new flags from the coprocessor instruction executing unit to the main processor flag register, wherein the data supplying unit may supply flags in the main processor flag register to the coprocessor together with the data in the source registers, the data storing unit may store the new flags transmitted from the coprocessor in the main processor flag register along with storing the calculation result in the destination registers, and the coprocessor instruction executing unit may execute the coprocessor calculation instruction using flags and data supplied by the data supplying unit, before outputting a new flag showing a state of a calculation result to the data storing unit.

The above construction enables the realization of the fourth object of the present invention. This is to say, by having flag information for a plurality of flags directly transmitted between the main processor and the coprocessor via the first and second flag buses in the same way as the operand data, an information processing device of high processing performance can be achieved.

Also, the coprocessor may include an input buffer for temporarily storing the data sent on the first bus, and the instruction detecting unit may detect a first transfer instruction indicating data transfer from the main processor to the coprocessor, the operand identifying unit may identify source registers specified by operands of the detected first transfer instruction, the data supplying unit may output data in the identified source register for the first transfer instruction on the first bus, the coprocessor instruction detecting unit, on detecting the first transfer instruction, may store the data on the first bus in the input buffer, and the coprocessor instruction executing unit may use the data in the input buffer in executing coprocessor calculation instructions which require at least three operands.

The above construction enables the realization of the fifth object of the present invention. This is to say, an information processing device which is favorable to execution of coprocessor instructions which require three or more operands can be realized. Also, when compared to a device where a plurality of pieces of operand data are supplied using buses provided for this purpose, increases in cost due to increased circuit size and increases in power consumption can be suppressed.

Also, the information processing device may further comprise: a saving buffer which has an area for storing data; a saving unit, installed in the coprocessor, for saving the data in the input buffer and in the output buffer into the saving buffer on receiving an interruption signal; and a returning unit, installed in the coprocessor, for returning the data in the saving buffer to the input buffer and to the output buffer on detecting an instruction for a return from an interruption, wherein the main processor may output an interruption signal to the saving unit on receiving an interruption request, and the coprocessor instruction detecting unit may notify the returning unit on detecting an instruction for the return from an interruption.

The above construction enables the realization of the sixth object of the present invention. This is to say, when an interruption process occurs during coprocessor processing, increases in execution time and a drop in performance can be suppressed so that the present information processing device can quickly transfer to the interruption process.

Also, the coprocessor instruction detecting unit may detect an instruction to perform task switching in accordance with a task number which identifies a task, the input buffer and the output buffer may include a plurality of pairs of storage areas, and the coprocessor may further includes a task management unit for allowing data input and output for one pair of storage areas which corresponds to the task number in the detected task switching instruction and for prohibiting data input and output for all other pairs of storage areas.

The above construction enables the realization of the seventh object of the present invention. This is to say, when performing a plurality of tasks, the above construction uses a pair of storage areas in the input buffer and output buffer corresponding to each task, so that when a task switching process occurs, increases in execution time and a drop in performance can be suppressed so that a high speed task switch can be performed.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 2 is a figure showing examples of coprocessor instructions for coprocessor 102 in the same embodiment;

DESCRIPTION OF THE PREFERRED EMBODIMENTS

First Embodiment

Figure 1:
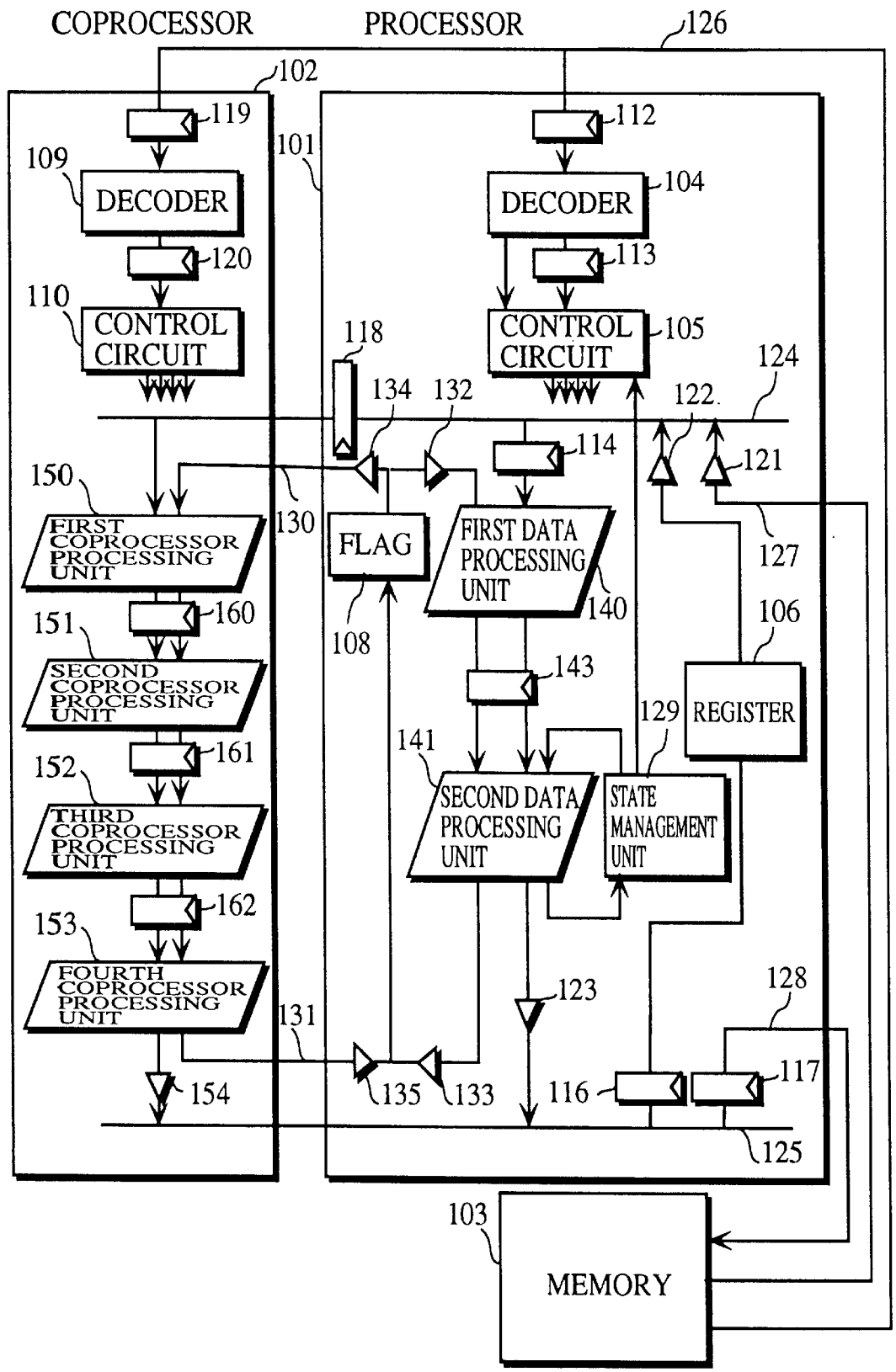
FIG. 1 is a block diagram showing the construction of the information processing device of the first embodiment of the present invention.

FIG. 1 is a block diagram showing the construction of the information processing device of the first embodiment of the present invention. The information processing device can be seen to be made up of processor 101, coprocessor 102 and memory 103, with, as shown in the figure, these elements being interconnected by the data processing unit input bus 124, data processing unit output bus 125, instruction supply bus 126, data bus 127, data bus 128, flag data bus 130 and flag data bus 131.

Processor 101 is composed of decoder 104, control circuit 105, general register 106, flag storage register 108, instruction register 112, micro instruction register 113, data latch 114, register write buffer 116, memory write buffer 117, coprocessor data latch 118, status management unit 129, pipeline latch 143, drivers 121–123 and 132–135, first data processing unit 140 and second data processing unit 141. Processor 101 processes the instructions in memory 103 by means of a five-stage pipeline process made up of an instruction fetch stage, an instruction decoding stage, a first execution stage, a second execution stage and a write stage. The instructions in memory 103 include instructions for processor 101 (hereinafter called "processor instructions") and instructions for coprocessor 102 (hereinafter called "coprocessor instructions"). When processor 101 decodes a coprocessor instruction in the instruction decoding stage, it retrieves the source data specified by the operands in the instruction from the general register 106 and supplies this data to coprocessor 102, with coprocessor 102 storing its calculation results in the general register 106. Here, processor 101 is set as a 32-bit processor, and where not clearly stated otherwise, the bus width is set at 32 bits.

Coprocessor 102 is composed of decoder 109, control circuit 110, instruction register 119, micro instruction register 120, first to third pipeline latches 160–162, first to fourth coprocessor processing units 150–153 and first to third pipeline latches 160–162. Coprocessor 102 is one of a plurality of coprocessors which executes coprocessor processes such as multiplications, divisions, sums of products, bit field calculations, string calculations, saturation calculations, queuing operations, context switching processes and filtering processes and which includes other coprocessors which, depending on use, can support the kinds of calculations which are demanded. In the present embodiment, the desired kind of calculation is set as multiplication with this being executed by means of a pipeline process made up of an instruction decoding stage and first-fourth execution stages. Here, examples of coprocessor instructions indicating multiplication are shown in FIG. 2. In this figure, "MULQ Dm, Dn" indicates the multiplication of the source register Dm (a 32-bit integer with added code) and the source register Dn (a 32-bit integer with added code) with the lower 32-bits of the result (a 64 bit figure) being stored in the destination register Dn and the upper 32-bits of the result (a 64 bit figure) being stored in the multiplication register MR in the general register 106. In the same figure, "MULQ imm8, Dn" indicates the multiplication of 32-bit value given by the expansion of 8-bit immediate data to which a code is applied and the source register Dn (a 32-bit integer with added code) with the result being stored in Dn and MR. Here, "MULQ imm16, Dn" and "MULQ imm32, Dn" are also the same.

Memory 103 stores a program made up of processor instructions and coprocessor instructions and the data used by processor 101 and coprocessor 102.

Decoder 104, in the instruction decoding stage, decodes the processor instructions and coprocessor instructions fetched from memory 103 via instruction supply bus 126 and instruction register 112 and outputs micro instructions for realizing the fetched instruction. More specifically, on decoding a coprocessor instruction (for the example in FIG. 2, when the upper four bits of the instruction code are "FH"), decoder 104 issues (1) a micro instruction reading the source register indicated by the operand in the coprocessor instruction, (2) a micro instruction latching the data read from the source register in coprocessor data latch 118, (3) a micro instruction having the flag data in flag storage register 108 output via driver 134 to flag data bus 130, (4) a micro instruction indicating NOP (no operation) to first data processing unit 140 and second data processing unit 141, (5) a micro instruction storing a calculation result of the coprocessor 102 in the destination register indicated by an operand, and (6) a micro instruction storing flag data from coprocessor 102 in flag storage register 108 via driver 135. Of these, the former three micro instructions are output directly to control circuit 105 and do not pass micro instruction register 113, while the remaining micro instructions are output to control circuit 105 via micro instruction register 113. Accordingly, the former three micro instructions are executed first during the instruction decoding stage. It should be noted here that these micro instructions may be set as shown in (1) to (6) above, or alternatively may be set so that one micro instruction is made up of a plurality of micro instructions.

Decoder 104 also sets a continuation number in accordance with the type of coprocessor instruction and outputs the continuation number to status management unit 129. Here, a continuation number expresses the difference between the number of execution stages for processor 101 and the number of execution stages for coprocessor 102. Accordingly, this indicates the number of execution stages of the idle state (NOP) which should be added to processor 101 during instruction execution by the coprocessor. In the present embodiment, the number of execution stages for coprocessor 102 and the number of execution stages for processor 101 are 4 and 2, respectively, so that when decoder 104 finds a decoding result that the coprocessor instruction is a multiplication instruction (for the example in FIG. 2, when the upper 8 bits in the instruction code are F6H, F9H and FBH), decoder 104 sets the continuation number at 2.

Control circuit 105 in processor 101 converts the micro instructions input either directly from decoder 104 or indirectly from decoder 104 via micro instruction register 113 into various kinds of control signals, as well as being the circuit which controls pipeline processing. When the above instructions (1), (2) and (3) which are the decoding result of a coprocessor instruction are input, control circuit 105, outputs a read signal for the indicated register in general register 106, a control signal for opening driver 122, a control signal for having coprocessor data latch 118 perform latching, and a control signal for opening driver 134 in the decoding stage which precedes the execution stage of the fetched instruction. In the same way, when the instructions (5) and (6) are input, control circuit 105 outputs a control signal for having general register 106 perform latching, a write signal for a register specified by general register 106, and a control signal for opening driver 135.

General register 106 is made up of registers D0–D3 which each hold 32-bit data and multiplication register MR which holds the upper 32 bits of a multiplication result.

Instruction register 112 is controlled by control circuit 105 so as to output an instruction fetched from memory 103 via instruction supply bus 126 to decoder 104. Every time there is a switch from the instruction fetch stage to the instruction decoding stage, this output switches to a following instruction.

Flag storage register 108 stores various kinds of flags showing processor status, with the flag generated by second data processing unit 141 of processor 101 and the flag generated by fourth coprocessor processing unit 153 of coprocessor 102 both being reflected by the control exercised by control circuit 105.

Micro instruction register 113 outputs micro instructions from decoder 104 to control circuit 105 according to control by control circuit 105. Every time there is a switch from the instruction decoding stage to the first execution stage, this output switches to a following instruction (or set of instructions).

Data latch 114 outputs operand data read from general register 106 via data processing unit input bus 124 to first data processing unit 140 according to control by control circuit 105. Every time there is a switch from the instruction decoding stage to the first execution stage, this output switches to a following instruction.

Register write buffer 116 outputs data from data processing unit output bus 125 to general register 106 after the completion of the second execution stage, according to control by control circuit 105.

Memory write buffer 117 outputs data onto data bus 128 from data processing unit output bus 125 after the completion of the second execution stage, according to control by control circuit 105.

Coprocessor data latch 118 outputs register data to coprocessor 102 via data processing unit input bus 124 according to control by control circuit 105 when there is a switch from the instruction decoding stage to the first execution stage.

Driver 121 has a gate which is opened according to control by control circuit 105 and is a driver for transmitting the data in memory 103 on data processing unit input bus 124 via data bus 127.

Driver 122 has a gate which is opened according to control by control circuit 105 and is a driver for transmitting the data from general register 106 on data processing unit input bus 124.

Driver 123 has a gate which is opened according to control by control circuit 105 and is a driver for transmitting the data from second data processing unit 141 on data processing unit output bus 125.

Data processing unit input bus 124 is used to transmit data from general register 106 inside processor 101 and from memory 103 to first data processing unit 140 and to coprocessor data latch 118, as well as transmitting data from coprocessor data latch 118 to first coprocessor processing unit 150 in coprocessor 102. It should be especially noted here that data processing unit input bus 124 transmits the data in general register 106 of processor 101 to first coprocessor processing unit 150 in coprocessor 102 via coprocessor data latch 118. In the present embodiment, this bus has two 32-bit widths.

Data processing unit output bus 125 is used to transmit the execution results from second data processing unit 141 in processor 101 and from fourth coprocessor processing unit 153 in coprocessor 102 to register write buffer 116 and memory write buffer 117 in processor 101. Note here that data processing unit output bus 125 is a bus for transmitting data processed by second data processing unit 141 of processor 101 and fourth coprocessor processing unit 153 of coprocessor 102 to general register 106 and memory 103. In the present embodiment, this bus has two 32-bit widths.

Instruction supply bus 126 is a bus for transmitting instructions stored in memory 103 to instruction register 112 in processor 101 and instruction register 119 in coprocessor 102.

Data bus 127 transmits data stored in memory 103 on data processing unit input bus 124 via driver 121.

Data bus 128 transmits data from data processing unit output bus 125 to memory 103 via memory write buffer 117.

Status management unit 129 manages all of the states of the pipeline stages of processor 101, and manages whether to proceed to a following process in a cycle following a present stage or whether to continue with a present stage. More specifically, status management unit 129 stores flag information showing a state of a pipeline stage. This flag information shows either "Next stage execution state" which indicates an advance to a following process in the cycle following a present stage or "Present stage continuation state" which indicates a continuation of a present stage in a following cycle. When a processor instruction is decoded by decoder 104, the flag information shows "Next stage execution state" with instruction execution being completed in two stages made up of a first execution stage and a second execution stage. When a coprocessor instruction is decoded by decoder 104, decoder 104 informs status management unit 129 of the continuation number, with, in the second next execution stage, the flag information showing "present stage continuation state" for a number of stages equal to this continuation number. For example, when informed of the continuation number 2, the flag information shows "Next stage execution state" in the first execution stage, before showing "Present stage continuation state" then "Present stage continuation state", then "Next stage execution state" in the second execution stage. By doing so, the status management unit 129 manages the number of execution stages of processor 101 so that it coincides with the number of execution stages of coprocessor 102.

Flag data bus 130 is a bus for transmitting the flag data in flag storage register 108 to coprocessor 102. The bit-width of this bus may be set according to the number of flags.

Flag data bus 131 is a bus for transmitting flag data processed by fourth coprocessor processing unit 153 to flag storage register 108 in processor 101. The bit-width of this bus may be set according to the number of flags.

Driver 132 has a gate which is opened according to control by control circuit 105 and is a driver for transmitting flag data from flag storage register 108 to first data processing unit 140.

Driver 133 has a gate which is opened according to control by control circuit 105 and is a driver for transmitting flag data from second data processing unit 141 to flag storage register 108.

Driver 134 has a gate which is opened according to control by control circuit 105 and is a driver for transmitting flag data from flag storage register 108 to coprocessor 102.

Driver 135 has a gate which is opened according to control by control circuit 105 and is a driver for transmitting flag data from coprocessor 102 to flag storage register 108.

First data processing unit 140 executes data processing during the first execution stage in processor 101 according to control by control circuit 105. When a coprocessor instruction is decoded by decoder 104, first data processing unit 140 is set to an idle state (NOP) according to control by control circuit 105.

Second data processing unit 141 executes data processing during the second execution stage for processor 101. When a coprocessor instruction is decoded by decoder 104, second data processing unit 141 is set to an idle state (NOP) according to control by control circuit 105.

Pipeline latch 143 opens its latch when there is a switch from the first execution stage to the second execution stage and transmits from first data processing unit 140 to second data processing unit 141 according to control by control circuit 105 in executing pipeline control.

As for coprocessor 102 in FIG. 1, during the instruction decoding stage, decoder 109 decodes instructions fetched from memory 103 via instruction supply bus 126 and instruction register 112. When the decoding result is a coprocessor instruction, decoder 109 issues a micro instruction for realizing the calculation content shown by the OP code of the coprocessor instruction. It should be noted here that it is not necessary to issue a micro instruction indicating the registers to be used for the read and write of operand data in the coprocessor instruction. This is because the read and write operations of the operand registers are executed by processor 101.

Control circuit 110 in the processor converts the micro instructions input from decoder 109 via micro instruction register 120 into various kinds of control signals, as well as being the circuit which controls pipeline processing for coprocessor 102.

Instruction register 119 outputs an instruction fetched from memory 103 via instruction supply bus 126 to decoder 109. Every time there is a switch from the instruction fetch stage to the instruction decoding stage, this output switches to a following instruction.

Micro instruction register 120 outputs micro instructions from decoder 109 to control circuit 110 when there is a switch from the instruction decoding stage to the first execution stage, according to control by control circuit 110 in executing pipeline control. Every time there is a switch from the instruction decoding stage to the first execution stage, this output switches to a following instruction (or set of instructions).

First coprocessor processing unit 150 executes data processing in the first execution stage of coprocessor 102.

Second coprocessor processing unit 151 executes data processing in the second execution stage of coprocessor 102.

Third coprocessor processing unit 152 executes data processing in the third execution stage of coprocessor 102.

Fourth coprocessor processing unit 153 executes data processing in the fourth execution stage of coprocessor 102.

First pipeline latch 160 opens its latch when there is a switch from the first execution stage to the second execution stage and transmits from first coprocessor processing unit 150 to second coprocessor processing unit 151 according to control by control circuit 110 in executing pipeline control.

Second pipeline latch 161 opens its latch when there is a switch from the second execution stage to the third execution stage and transmits from second coprocessor processing unit 151 to third coprocessor processing unit 152 according to control by control circuit 110 in executing pipeline control.

Third pipeline latch 162 opens its latch when there is a switch from the third execution stage to the fourth execution stage and transmits from third coprocessor processing unit 152 to fourth coprocessor processing unit 153 according to control by control circuit 110 in executing pipeline control.

The following is an explanation of the information processing device of the first embodiment of the present invention which is constructed as described above.

Figure 3:
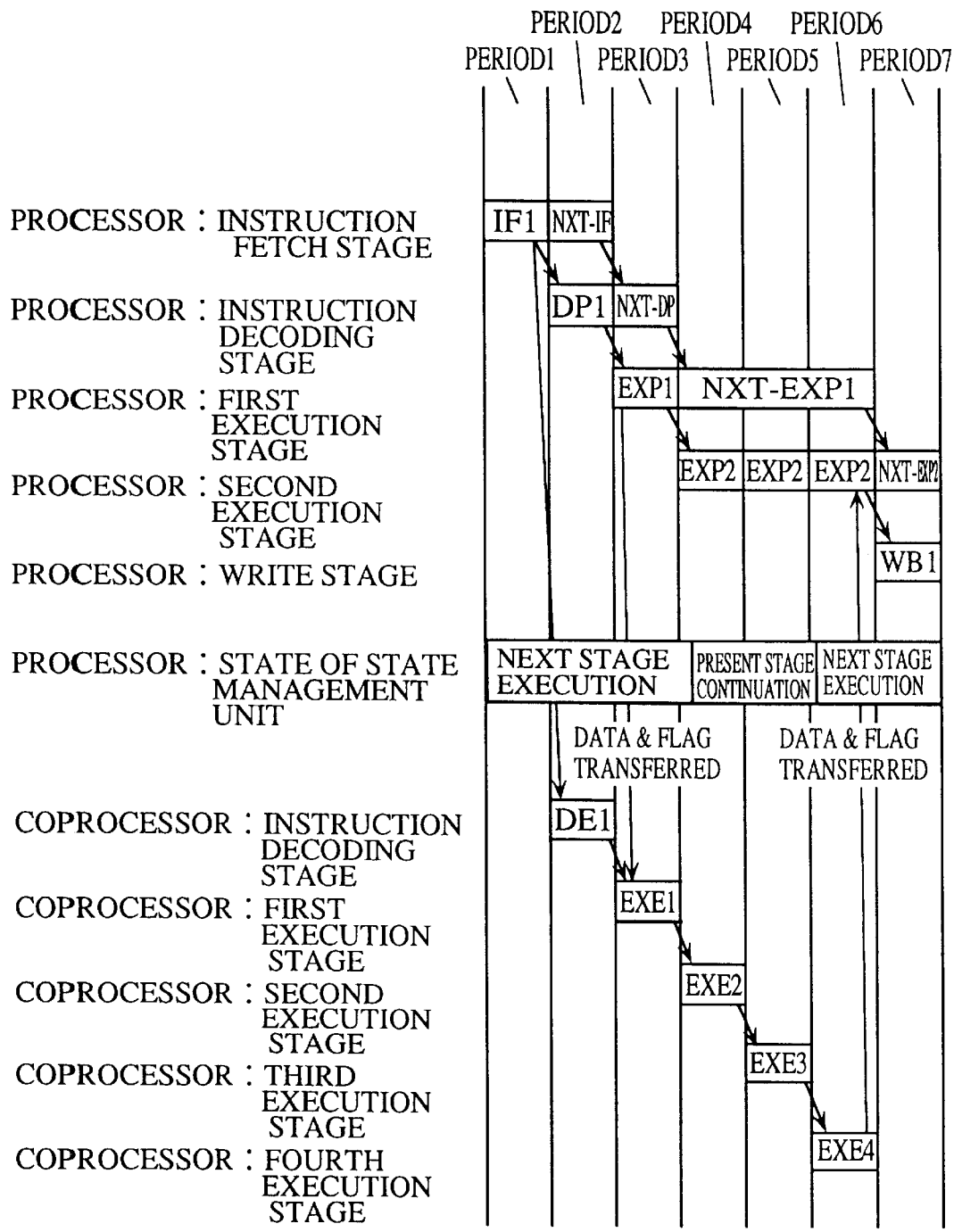
FIG. 3 is a time chart showing the states of pipeline processing for the information processing device of the same embodiment.

FIG. 3 is a time chart showing the states of pipeline processing when, for coprocessor 102, an operation which processes data from general register 106 and from flag storage register 108 of processor 101 and then stores the data which is the processing result in general register 106 and in flag storage register 108.

In this figure, "IF1" is a stage where a coprocessor instruction is retrieved by processor 101. "DP1" is a stage where a coprocessor instruction is decoded by processor 101. "EXP1" and "EXP2" respectively are the first and second execution stages (or NOP) for a coprocessor instruction in processor 101. "WB1" is a stage where a calculation result of coprocessor 102 is written by processor 101. "DE1" is a stage where a coprocessor instruction is decoded by coprocessor 102. "EXE1", "EXE2" "EXE3" and "EXE4" respectively are the first, second, third and fourth execution stages for a coprocessor instruction in coprocessor 102. "NXT-IF" is a stage where an instruction which comes after the instruction fetched by "IF1" is fetched by processor 101. "NXT-DP" is a stage where a next instruction is decoded by processor 101. "NXT-EXP1" and "NXT-EXP2" respectively are the first and second execution stages for a next instruction in processor 101.

In time period 1, memory 103 outputs an instruction onto instruction supply bus 126 which leads to processor 101 and coprocessor 102 in the instruction fetch stage (IF1) of processor 101.

In switching from time period 1 to time period 2, control circuit 105 in processor 101 advances from (IF1) to (DP1) and accordingly opens instruction register 112 of processor 101. In the same way, control circuit 110 in coprocessor 102 advances from (IF1) to (DE1) and accordingly opens instruction register 119 of coprocessor 102.

In time period 2, memory 103 outputs the next instruction onto instruction supply bus 126 which leads to processor 101 and coprocessor 102 in the instruction fetch stage (NXT-IF1).

In the instruction decoding stage (DP1), decoder 104 in processor 101 receives the instruction after instruction register 112 is opened and then decodes the instruction. Then, control circuit 105 uses the micro instructions output by decoder 104, opens driver 122 so that the data in general register 106 placed onto data processing unit input bus 124 and opens driver 134 so that the flag information in flag storage register 108 is placed onto the flag data bus 130.

In the instruction decoding stage (DE1) of coprocessor 102, decoder 109 in coprocessor 102 receives the instruction after instruction register 119 is opened and then decodes the instruction.

In switching from time period 2 to time period 3, control circuit 105 in processor 101 advances from (NXT-IF) to (NXT-DP) and accordingly opens instruction register 112.

Control circuit 105 in processor 101, in advancing from pipeline stage (DP1) to (EXP1), opens micro instruction register 113, data latch 114 and coprocessor data latch 118. Similarly, control circuit 110 in coprocessor 110, in advancing from pipeline stage (DE1) to (EXE1), opens micro instruction register 120. Once micro instruction register 113 has been opened, control circuit 105 in processor 101 receives the micro instructions decoded by decoder 104 in the instruction decoding stage (DP1). Similarly, once micro instruction register 120 has been opened, control circuit 110 in coprocessor 102 receives the micro instructions decoded by coprocessor 102's decoder 109 in the instruction decoding stage (DE1).

In time period 3, decoder 104 in processor 101 receives the instruction after instruction register 112 is opened and then decodes the instruction in the instruction decoding stage (NXT-DP) of processor 101.

In the first execution stage (EXP1) of processor 101, first data processing unit 140 in processor 101 does not execute data processing (NOP).

In the first execution stage (EXE1) of coprocessor 102, first coprocessor processing unit 150 in coprocessor 102 executes data processing.

In switching from time period 3 to time period 4, control circuit 105 of processor 101, in switching pipeline stages from (NXT-DP) to (NXT-EXP), opens micro instruction register 113. After micro instruction register 113 has been opened, control circuit 105 of processor 101 then receives the micro instructions decoded by decoder 104 in the (NXT-DP) instruction decoding stage.

In switching pipeline stages from (EXP1) to (EXP2), control circuit 105 of processor 101 opens pipeline latch 143 of processor 101.

In switching pipeline stages from (EXE1) to (EXE2), control circuit 110 of coprocessor 102 opens first pipeline latch 160 of coprocessor 102.

In time period 4, first data processing unit 140 in processor 101 executes a first data processing of a next instruction in the first instruction execution stage (NXT-EXP1) of processor 101.

In the second instruction execution stage (EXP2) of processor 101, second data processing unit 141 does not execute data processing (NOP).

Status management unit 129 changes from next stage execution state to present stage continuation state and transmits a present stage continuation signal to control circuit 105.

In the second instruction execution stage (EXE2) of the coprocessor 102, second coprocessor processing unit 151 of coprocessor 102 executes data processing.

In switching from time period 4 to time period 5, control circuit 105 in processor 101 does not open pipeline latch 143 since the present stage continuation signal was sent from status management unit 129. Accordingly, the state of the present stage is continued for the next stage.

Next, control circuit 110 in coprocessor 102 opens second pipeline latch 161 in switching the pipeline stage from (EXE2) to (EXE3).

In time period 5, the first instruction execution stage (NXT-EXP1) continues for processor 101, so that first data processing unit 140 in processor 101 continues with the first data processing of the next instruction as described above.

Since the stage is continued in the second instruction execution stage (EXP2) of processor 101, second data processing unit 141 in processor 101 does not execute data processing (NOP).

In the third instruction execution stage (EXE3) of coprocessor 102, third coprocessor processing unit 152 of coprocessor 102 executes data processing.

In switching from time period 5 to time period 6, control circuit 105 in processor 101 does not open pipeline latch 143 since a present stage continuation signal was sent from status management unit 129 (NOP).

Next in coprocessor 102, control circuit 110 opens third pipeline latch 162 in switching the pipeline stage from (EXE3) to (EXE4).

In time period 6, the first instruction execution stage (NXT-EXP1) continues for processor 101, so that first data processing unit 140 in processor 101 continues with the first data processing of the next instruction execution instruction as described above.

Since the stage is continued in the second instruction execution stage (EXP2) of processor 101, second data processing unit 141 in processor 101 does not execute data processing (NOP).

By having the (EXP2) stage continued by second data processing unit 141 for 3 stages (in other words, by extending this stage by 2 stages), status management unit 129 has the stage of processor 101 continued for a time period which is equivalent to the continuation number, before switching from "Present stage continuation state" to "Next stage execution state" and terminating the transmission of the present stage continuation signal to control circuit 105 of processor 101.

In the fourth instruction execution stage (EXE4) of coprocessor 102, fourth coprocessor processing unit 153 of coprocessor 102 executes data processing and so outputs result data on data processing unit output bus 125 and flag information on flag data bus 131. Control circuit 110 in coprocessor 102 then opens driver 154 in coprocessor 154 so that the data processed by fourth coprocessor processing unit 153 is output on data processing unit output bus 125.

In switching from time period 6 to time period 7, control circuit 105 in processor 101 opens pipeline latch 143 in processor 101 in switching pipeline stages from (NXT-EXP1) to (NXT-EXP2).

Control circuit 105 in processor 101 opens driver 135 in switching pipeline stages from (EXP2) to (WB1), so that the flag information from flag data bus 131 is transmitted to flag storage register 108.

In time period 7, in the second instruction execution stage (NXT-EXP2) of processor 101, second data processing unit 141 executes the second data processing of the next instruction execution.

In the write stage (WB1) of processor 101, general register 106 receives data from data processing unit output bus 125 and stores this data. Similarly, flag storage register 108 receives flag information sent from coprocessor 102 to processor 101 on flag data bus 131 and stores the flag information.

In this way, coprocessor 102 can directly use the data in general register 106 in calculation, so that the process can be speeded up by the time taken by the transferal of data via the memory which is no longer necessary for this technique. Here, referencing of the flags in flag storage register 108 of processor 101 can be speeded up in the same way. Additionally, execution time is reduced due to the avoidance of data inequalities during transfer and the avoidance of disorder in the pipeline processing of processor 101 and coprocessor 102.

Here, when coprocessor 102 is not needed, data processing unit input bus 124 and data processing unit output bus 125 which are used for connecting processor 101 and coprocessor 102, a part of instruction supply bus 126 which is used for connecting memory 103 to coprocessor 102, flag data bus 130 which is used for connecting processor 101 to coprocessor 102, and flag data bus 131 which is used for connecting coprocessor 102 to processor 101 can all be disconnected.

Also, when compared to the related art example, it is no longer necessary when the coprocessor processes data to transfer the data to be processed to the coprocessor via the memory, meaning that execution time can be reduced.

Furthermore, in this first embodiment, decoder 104 in processor 101 determines a continuation number according to a type of coprocessor instruction, but it is also possible for processor 101 to be connected to any of the data processing units of coprocessor 102 by a calculation termination signal line, which by transmitting a calculation termination signal, may terminate the state continuation by status management unit 129. Alternatively, the coprocessor instruction itself may be set so as to include information showing a difference in pipeline stages between processor 101 and coprocessor 102, so that decoder 104 informs status management unit 129 of the state continuation number from this information.

It should be noted here that the above explanation has described the case when processor 101 is connected to only one coprocessor 102, although the system may be constructed so that processor 101 is connected to a plurality of different types of coprocessors 102. For an example where processor 101 is connected to a coprocessor for executing multiplication, a coprocessor for executing sum of products and a coprocessor for executing division, then the five buses made up of instruction supply bus 126, data processing unit input bus 124, data processing unit output bus 125, flag data bus 130 and flag data bus 131 may be provided between processor 101 and each coprocessor. In this case, it is necessary for the bit pattern in the instruction code of coprocessor instructions to be allocating a unique pattern for each of the coprocessors. Processor 101 can then execute the supplying and storage of register data and flags in the same way as the present embodiment for any of the coprocessors using the aforementioned buses. Here, these co-processes are designed so as so execute coprocessor instructions in the same way as coprocessor 102 in the present embodiment only when the decoding result indicates a coprocessor instruction for that particular coprocessor.

Also, the present embodiment described the case where processor 101 executes a 2-stage pipeline process and coprocessor 102 executes a 4-stage pipeline process, although the present construction is not limited to such values. When coprocessor 102 executes a b-stage (1≦b) pipeline process and processor 101 executes a c-stage (1≦c≦b) pipeline process, a state management unit may be provided at the cth stage with this state management unit being informed of the continuation number b-c by the decoder and having the cth stage continue execution for a number of stages equal to the continuation number. Here, when the number of execution stages of the processor is longer than the number for the coprocessor (which is to say c>b ), the continuation number may be set at zero. In this case, at the point where a number c of execution stages have been completed, the processor takes the calculation result from the coprocessor, with the coprocessor outputting the calculation result from the point where a number D of execution stages have been completed until the processor completes a number c of execution stages and so receives the execution result.

Furthermore, instruction supply bus 126 was described as being connecting to the input side of instruction register 112 of processor 101 and to the input side of instruction register 119 of coprocessor 102, although it is also possible to provide an instruction supply bus which is only connects the input side of instruction register 112 of processor 101 to memory 103, with another bus being used to connect the output side of instruction register 112 of processor 101 to the input side of decoder 109 of coprocessor 102. In this way, instruction register 119 can be omitted and the electrical load of the instruction supply bus can be reduced.

Figure 11:
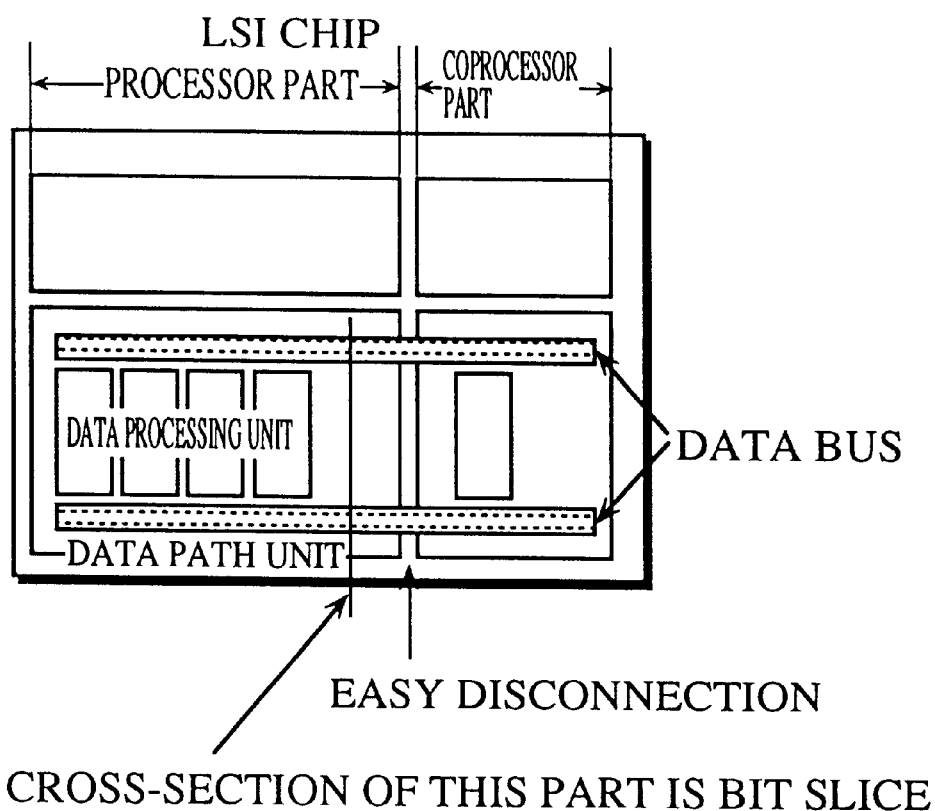
FIG. 11 is a figure showing an example of an LSI layout for the information processing device of the present invention.

Here, when the present information processing device is constructed of one LSI, then as shown in FIG. 11, the layout of processor 101 can be classified into a control module unit composed of decoder 104 and control circuit 105, a nd a data path unit composed of first data processing unit 140, second data processing unit 141, a data bus (data processing unit input bus 124, data processing unit output bus 125, instruction supply bus 126) and the like. The layout of coprocessor 102 can also be classified into a control module unit composed of decoder 109 and control circuit 110 and a data path unit composed of first to fourth coprocessor processing units 150–153, a data bus and the like. In this layout there will always be dependency for the bit slice (bit width) of the data bus in one edge of the layout of the data path units, so that since the data bus is shared between the processor and coprocessor in the present information processing device, new coprocessors for different types of calculation can easily be added, regardless of whether coprocessor 102 is already present or not. In this way, an information processing device with a plurality of coprocessors which each have different functions can be easily achieved on one chip.

Second Embodiment

Figure 4:
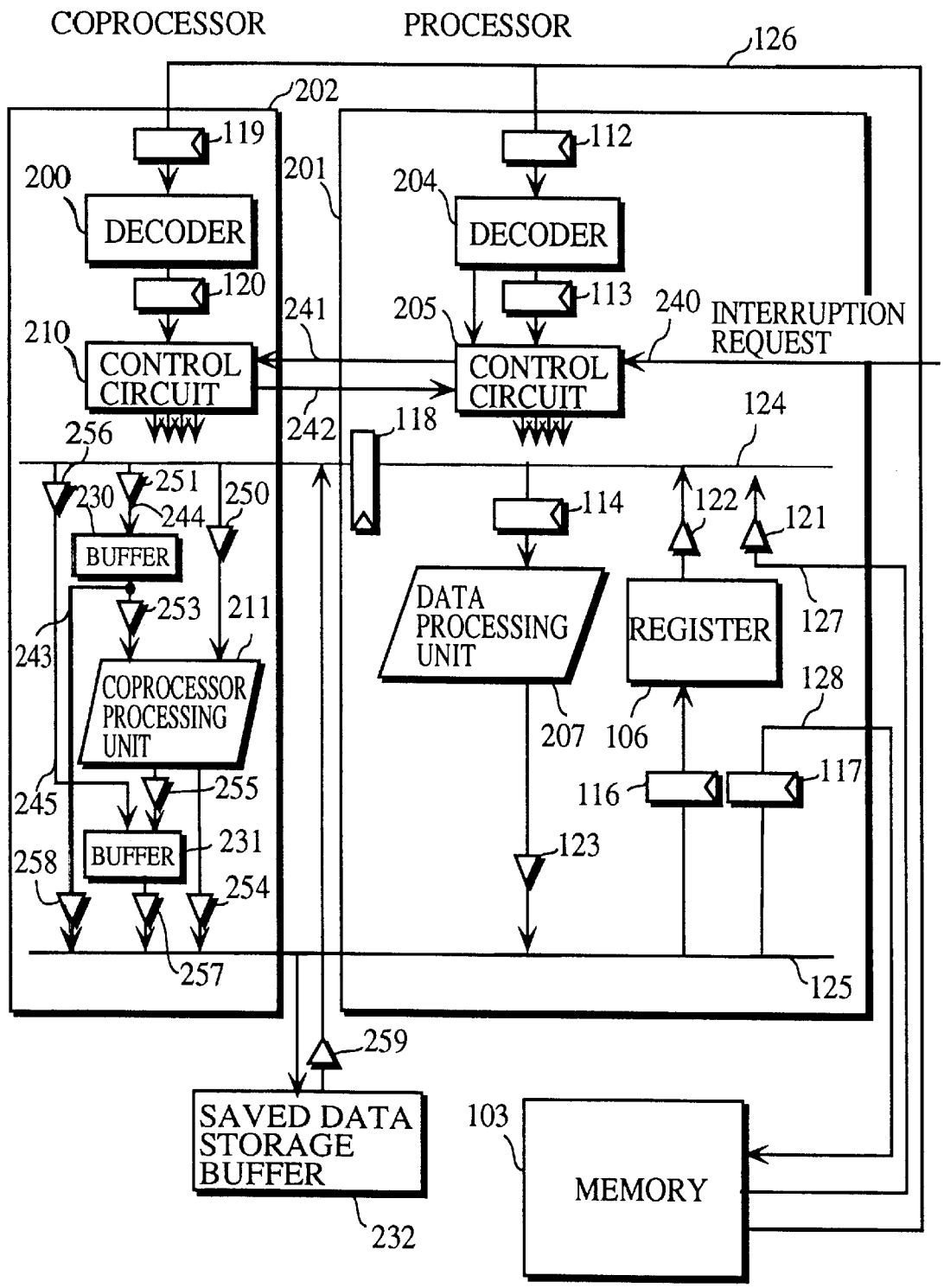
FIG. 4 is a block diagram showing. the construction of the information processing device of the second embodiment of the present invention.

FIG. 4 is a block diagram showing the construction of the information processing device of the second embodiment of the present invention. This information processing device can be seen to be composed of processor 201, coprocessor 202, memory 203, saved data storage buffer 232 and driver 259. Note here that construction elements which are the same as those in the first embodiment have been given the same reference numerals and their explanation has been omitted, so that the following explanation will focus on the differences with the first embodiment.

In FIG. 4, processor 201 is set as executing a 4-stage pipeline process made up of an instruction fetch stage, an instruction decoding stage, an instruction execution stage and a write stage, with the execution stage being considered for ease of explanation as being composed of only one stage. The main differences with the first embodiment lie in the point regarding the execution of a transfer instruction for transferring data in general register 106 between and pro- cessor 201 and coprocessor 202 and in the point regarding a branch to an interrupt process after establishing a response to a notification to coprocessor 202 at the start of an interrupt process. As a result, the construction further includes interruption request signal line 240, interruption signal line 241 and completion signal line 242. In this embodiment, data processing unit output bus 125, which was composed of two 32-bit buses in the first embodiment, may be composed of just one 32-bit bus.

Coprocessor 202 is set as executing a 4-stage pipeline process made up of an instruction fetch stage, an instruction decoding stage, an instruction execution stage and a write stage, with the execution stage being considered for ease of explanation as being composed of only one stage. The main differences with the first embodiment lie in the point regarding the execution of coprocessor transfer instructions and in the point regarding the reception of a notification of the start of an interrupt process from processor 201, the halting of the coprocessor instruction which is mid-execution and saving of data, and the transmission of a response to processor 201 showing a ready state. As a result, the construction additionally includes data processing unit input buffer 230, data processing unit output buffer 231, saved data storage buffer 232 and the drivers 250, 251 and 253–259 around them, with these being connected by data processing unit input buffer saving bus 243 and data processing unit output buffer return bus 245.

Here, coprocessor transfer instructions in the present embodiment consist of instructions for data transfer from general register 106 inside processor 201 to data processing unit input buffer 230 inside coprocessor 202 and of instructions for data transfer from data processing unit output buffer 231 to general register 106 inside processor 201. These are expressed in a format, such as that shown below, which specifies the source and destination of the transfer instruction ("MOVE" instruction), such as data processing unit input buffer 230 (abbreviated to ex_inBUF) and data processing unit output buffer 231 (abbreviated to ex_outBUF).

MOV Dn, ex_inbuf: data transfer from register Dn to ex_inBUF

MOV ex-outBUF, Dn: data transfer from to ex_outBUF to register Dn

In the present embodiment, coprocessor 202 is set as a processor which executes coprocessor instructions which specify calculations which involve 3 or more pieces of operand data, such as the 3-item calculation Dn*Dm+D1. In doing so, coprocessor transfer instructions are used to transfer one piece of operand data D1 for the 3-item calculation to coprocessor 202 beforehand. In the same way, when the calculated result of the 3-item calculation increases to multiple word length, transfer instructions are used to transfer part of the calculated result to processor 201.

Interruption request signal line 240 in processor 201 transfers interruption requests from outside processor 201 to control circuit 205 of processor 201.

Interruption request signal line 241 transfers interruption requests from control circuit 205 of processor 201 to control circuit 210 of coprocessor 202.

Completion signal line 242 transfers completion signals for the processing during an interruption request and the processing for the completion of interruption processing from control circuit 210 of coprocessor 202 to control circuit 205 of processor 201.

Decoder 204 is equipped with the functions of decoder 104 in the first embodiment, but differs in having a function for decoding coprocessor transfer instructions. More specifically, when, as a result of decoding, general register 106 is specified as the source of a transfer instruction (MOV Dn, ex_inBUF) and data processing unit input buffer 230 is specified as the destination, the decoder 204 issues the following micro instructions:

(P1.1) Read data from register Dn.

(P1.2) Open driver 122, latch data read from source register using coprocessor data latch 118.

When the result of decoding is (MOV ex_outBUF, Dn), the decoder 204 issues the following micro instructions:

(P2.1) Latch data from data processing unit output bus 125 using register write buffer 116.

(P2.2) Write data in register write buffer 116 in register Dn.

When the result of decoding is a return from an interruption process (abbreviated to (rti instruction)), the decoder 204 issues the following micro instruction:

(P3.1) Return process (a return to a return address).

Control circuit 205 is equipped with the functions of control circuit 105 in the first embodiment, but differs in having a function, when an interruption request is received from outside processor 201 via interruption request signal line 240, for informing the control circuit 210 of coprocessor 202 of the interruption via interruption signal line 241 and controlling a branch to an interruption process on receiving a response from coprocessor 202 via completion signal line 242 which indicates that the preparation has been completed. It also outputs control signals corresponding to each of the micro instructions given above as (P1.1), (P1.2), (P2.1), (P2.1) and (P3.1).

Data processing unit 207 executes the processing in the execution stage of processor 201.

The decoder 209 in coprocessor 202 is equipped with the functions of decoder 109 in the first embodiment, but differs in having a function for decoding coprocessor transfer instructions and interruption return programs. More specifically, when the decoding result is (MOV Dn, ex_inBUF), the decoder issues the following micro instructions:

(E1.1) Open driver 251, output the data from data processing unit input bus 124 to data processing unit input buffer 230.

(E1.2) Latch data transmitted from data processing unit input bus 124 via driver 251 in data processing unit input buffer 230.

When the decoding result is (MOV ex_outBUF, Dn), the decoder issues the following micro instructions:

(E2.1) Open driver 257, output data in data processing unit output buffer 231 to data processing unit output bus 125.

(E2.2) Write data from register write buffer 116 into register Dn.

When the decoding result is a return instruction from an interruption process (rti instruction), the decoder issues the following micro instructions:

(E4.1) Write saved data in saved data storage buffer 232 and open driver 259.

(E4.2) Open driver 251, write in data processing unit input buffer 230.

(E4.3) Write other stored data in saved data storage buffer 232 and open driver 259.

(E4.4) Open driver 256, write in data processing unit output buffer 231.

(E4.5) Indicate output on completion signal line 242.

The control circuit 210 in coprocessor 202 is equipped with the functions of control circuit 110 in the first embodiment, but differs in also having a function for executing a save process into saved data storage buffer 232 at the start of an interruption process. More specifically, when an interruption signal is received via interruption signal line 241, control circuit 210 executes the following control processes:

(E3.1) Open driver 258, have data output from data processing unit input buffer 230 to data processing unit output bus 125.

(E3.2) Have data on data processing unit output bus 125 written in saved data storage buffer 232.

(E3.3) Open driver 257, have data in data processing unit output buffer 231 output to data processing unit output bus 125.

(E3.4) Have data on data processing unit output bus 125 written into saved data storage buffer 232.

(E3.5) Have signal output on completion signal line 242.

Control circuit 210 also outputs various kinds of control signals which correspond to the aforementioned (E1.1), (E1.2), (E2.1), (E2.2), (E1.1), (E4.1), (E4.1), (E4.3) and (E4.5).

Coprocessor processing unit 211 executes the coprocessor instructions in the execution stage of coprocessor 202.

Data processing unit input buffer 230 is a buffer which, in order for coprocessor processing unit 211 to process using a plurality of operands, stores the operands to be transferred from processor 201 or coprocessor 202 via data processing unit input bus 124.

Data processing unit output buffer 231 is a buffer which, in order for a plurality of pieces of data to be processed by coprocessor processing unit 211 and then output, stores the operands to be transferred to processor 201 or coprocessor 202 via data processing unit output bus 125.

Saved data storage buffer 232 is a buffer for saving the data in data processing unit input buffer 230 and data processing unit output buffer 231 of coprocessor 202 and in this embodiment is composed of a FIFO (first in, first out) memory which has capacity for two 32-bit pieces of data. Saved data storage buffer 232 is shown as being external to both processor 201 and coprocessor 202, although it may be provided inside either processor 201 or coprocessor 202. Similarly, saved data storage buffer 232 is shown as being connected to both processor 201 and coprocessor 202 via data processing unit output bus 125, although it may be connected to any of data processing unit input bus 124, data bus 127 from memory 103 to processor 201 or data bus 128 from processor 201 to memory 103.

Data processing unit input buffer saving bus 243 is a bus for saving the data from data processing unit input buffer 230 of coprocessor 202 into saved data storage buffer 232 when there is an interruption request.

Data processing unit input buffer return bus 244 is a bus for returning the data stored in saved data storage buffer 232 to data processing unit input buffer 230 of coprocessor 202 when the interruption process is complete.

Data processing unit output buffer return bus 245 is a bus for returning the data stored in saved data storage buffer 232 to data processing unit output buffer 231 of coprocessor 202 when the interruption process is complete.

Driver 250 is opened according to a control signal from control circuit 205 and transmits data from data processing unit input bus 124 to coprocessor processing unit 211.

Driver 251 is opened according to a control signal from control circuit 205 and transmits data from data processing unit input bus 124 to data processing unit input buffer 230.

Driver 253 is opened according to a control signal from control circuit 205 and transmits data from data processing unit input buffer 230 to coprocessor processing unit 211.

Driver 254 is opened according to a control signal from control circuit 205 and transmits data from coprocessor processing unit 211 to data processing unit output bus 125.

Driver 255 is opened according to a control signal from control circuit 205 and transmits data from coprocessor processing unit 211 to data processing unit output buffer 231.

Driver 256 is opened according to a control signal from control circuit 205 and transmits data from data processing unit input bus 124 to data processing unit output buffer 231.

Driver 257 is opened according to a control signal from control circuit 205 and transmits data from data processing unit output buffer 231 to data processing unit output bus 125.

Driver 258 is opened according to a control signal from control circuit 205 and transmits data from data processing unit input buffer 230 on data processing unit output bus 125.

Driver 259 is opened when the saved data stored in saved data storage buffer 232 is returned, and transmits data from saved data storage buffer 232 on data processing unit input bus 124.

The following is an explanation of the operation of the information processing device of the second embodiment of the present invention which is constructed as described above, with the explanation being divided into (2.1) the processing of a coprocessor transfer instruction from general register 106 to data processing unit input buffer 230, (2.2) processing of a coprocessor instruction using operand data in data processing unit input buffer 230, (2.3) processing of coprocessor transfer instruction from data processing unit output buffer 231 to general register 106, (2.4) data saving of data in data processing unit input buffer 230 and data processing unit output buffer 231 at the start of an interruption process, and (2.5) returning of data to data processing unit input buffer 230 and data processing unit output buffer 231 when an interruption process is complete.

(2.1) Writing data into data processing unit input buffer 230

Figure 5:
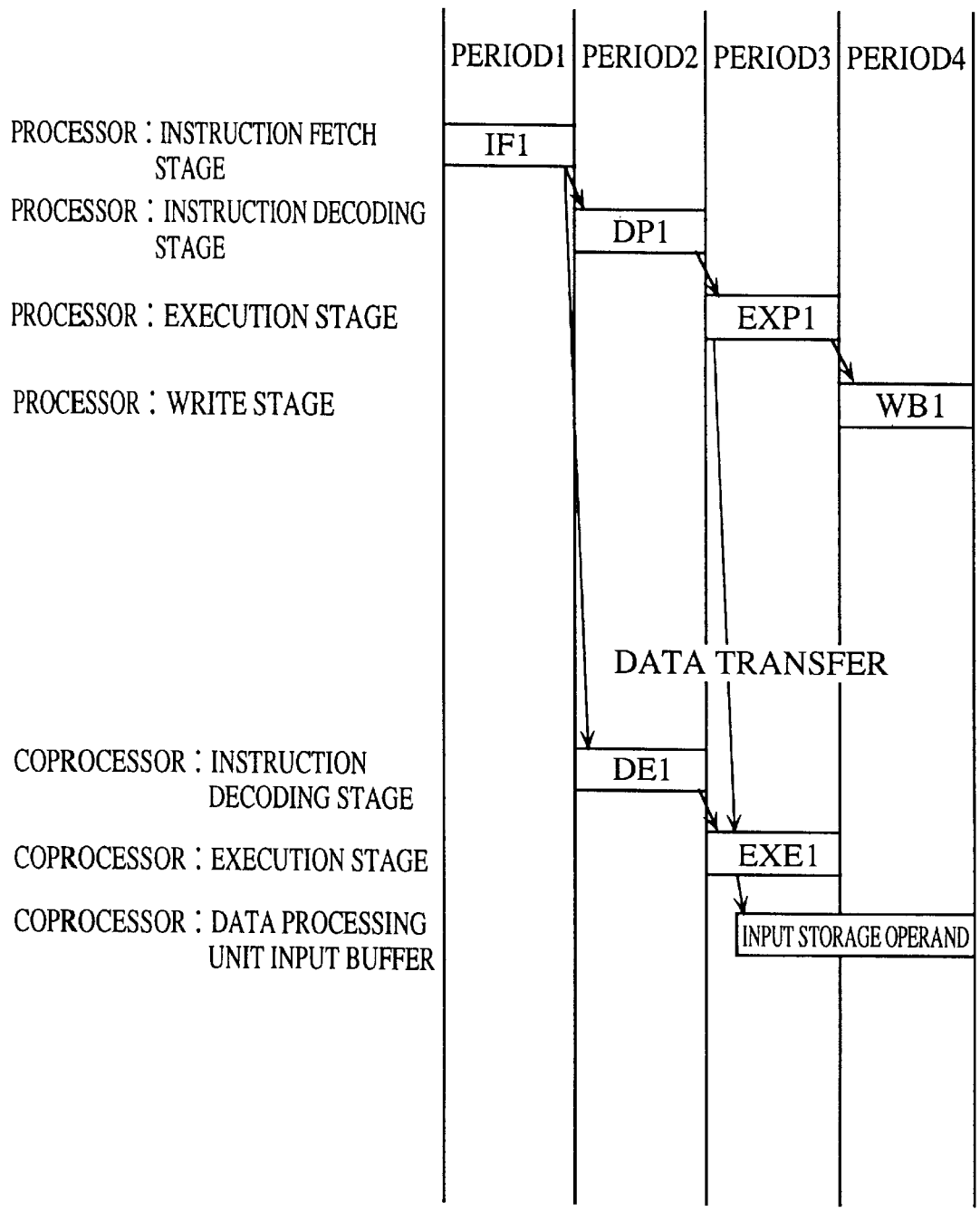
FIG. 5 is a time chart showing the states of pipeline processing of coprocessor 202 when the operand held by general register 106 is written into data processing unit input buffer 230 for the information processing device of the same embodiment.

FIG. 5 is a time chart showing the states of pipeline processing when executing a coprocessor transfer instruction which has data stored in general register 106 in processor 201 written into data processing unit input buffer 230.

In this figure, "IF1" is a stage where a coprocessor transfer instruction is retrieved by processor 201. "TDP1" is a stage where a coprocessor transfer instruction is decoded by processor 201. "EXP1" is the first instruction execution stage of a coprocessor transfer instruction in processor 201 in which data processing is not actually executed (NOP). "WB1" is a stage where a calculation result of the coprocessor transfer instruction is written by processor 201. "DE1" is a stage where a coprocessor transfer instruction is decoded by coprocessor 202. "EXE1" is the execution stage for an execution instruction in coprocessor 202. Here, "input storage operand" shows the theorem timing for storing the data written into data processing unit input buffer 230.

In time period 1, memory 103 outputs the instruction onto instruction supply bus 126 which leads to processor 201 and coprocessor 202 in the instruction fetch stage of processor 201.

In switching from time period 1 to time period 2, control circuit 205 in processor 201 advances from (IF1) to (DP1) and accordingly opens instruction register 112 of processor 201. In the same way, control circuit 210 in coprocessor 202 advances from (IF1) to (DE1) and accordingly opens instruction register 119 of coprocessor 202.

In time period 2, in the instruction decoding stage (DP1) of processor 201, decoder 204 in processor 201 receives the fetched instruction after instruction register 112 is opened and then decodes the instruction. Then, control circuit 205 uses the micro instructions output by decoder 204 and, by opening driver 122, has the operand in general register 106 placed onto data processing unit input bus 124.

In the instruction decoding stage (DE1) of coprocessor 202, decoder 209 in coprocessor 202 receives the instruction after instruction register 119 is opened and then decodes the instruction.

In switching from time period 2 to time period 3, control circuit 205 in processor 201, in advancing from pipeline stage (DP1) to (EXP1), opens micro instruction register 113 and data latch 114. As a result, micro instructions are transmitted from decoder 204 to control circuit 205, so that by means of control circuit 205 in processor 201 executing pipeline processing, operands are transmitted to data processing unit 207 in processor 201 from data processing unit input bus 124. Here, co-processor data latch 118 is opened so that operands are transmitted to coprocessor 202 from data processing unit input bus 124. Similarly, control circuit 210 in coprocessor 202, in advancing from pipeline stage (DE1) to (EXE1), opens micro instruction register 120. Once micro instruction register 113 in processor 201 has been opened, control circuit 205 in processor 201 receives the micro instructions decoded by decoder 204 in the instruction decoding stage (DP1). Similarly, once micro instruction register 120 has been opened, control circuit 210 in coprocessor 202 receives the micro instructions decoded by decoder 209 in the instruction decoding stage (DE1).

In time period 3, in the execution stage (EXP1) of processor 201, data processing unit 207 in processor 201 does not execute data processing (NOP).

In the instruction execution stage (EXE1) of coprocessor 202, control circuit 210 in coprocessor 202 opens driver 251 which transmits one 32-bit operand on data processing unit input bus 124 to data processing unit input buffer 230 in coprocessor 202. This operand is then stored in data processing unit input buffer 230.

(2.2) Execution of Coprocessor Instruction using Operand Data in Data Processing Unit Input Buffer 230

Figure 6:
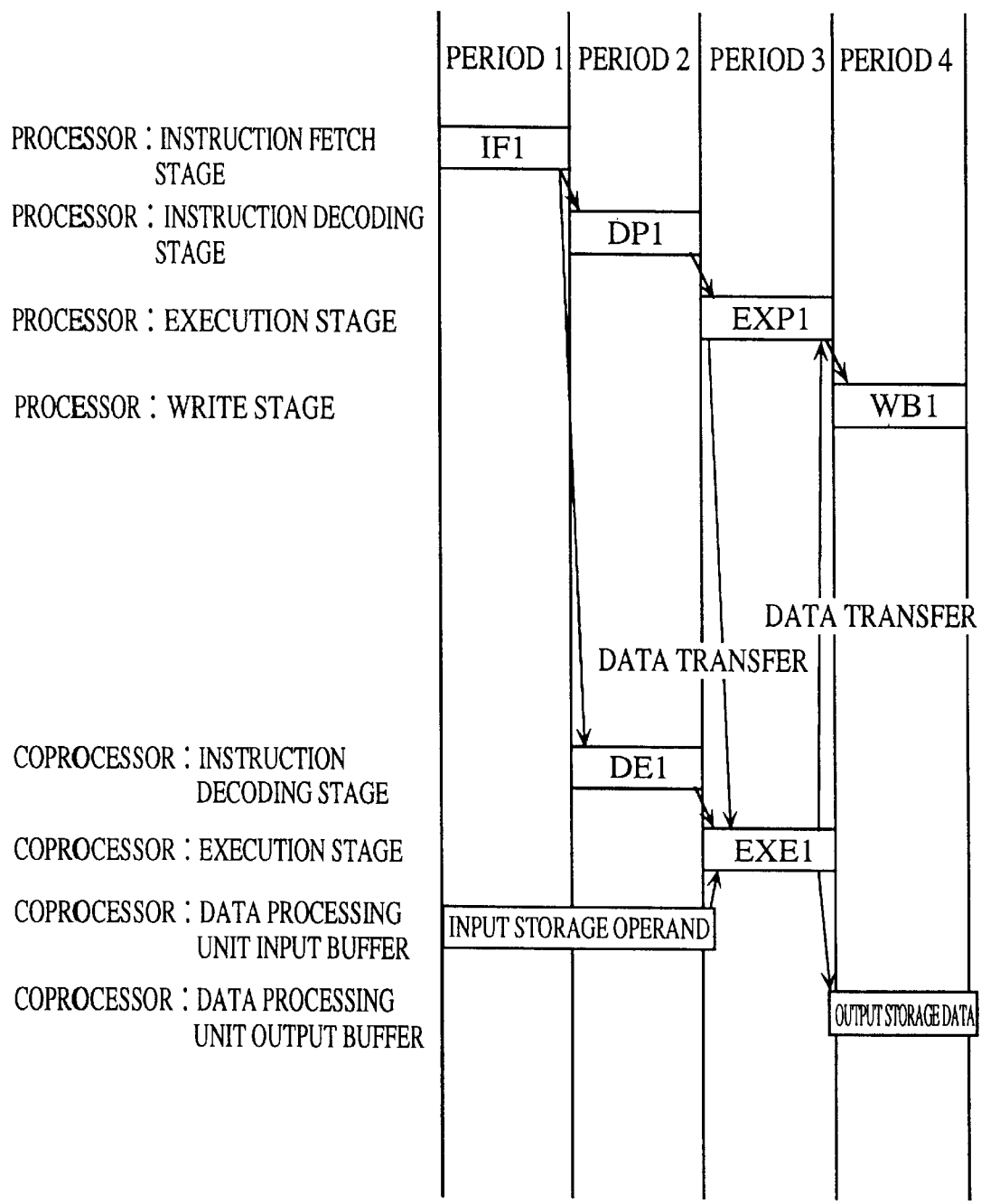
FIG. 6 is a time chart showing the states of pipeline processing of the execution instruction of coprocessor processing unit 211 when writing an output result into general register 106 of the main processor and into data processing unit output buffer 231 using the operand stored in general register 106 of the main processor and the operand stored in data processing unit input buffer 230, for the information processing device of the same embodiment.

FIG. 6 is a time chart showing the states of pipeline processing of coprocessor 202 when executing an 3-item calculation instruction which uses the data stored in general register 106 of the main processor and the data stored in data processing unit input buffer 230, which transfers one part of a calculation result to general register 106 of processor 201 and which writes another part of the calculation result into data processing unit output buffer 231. In this figure, the legend "output storage data" shows the timing of the storage of data in data processing unit output buffer 231.

In time period 1, memory 103 outputs the instruction onto instruction supply bus 126 which leads to processor 201 and coprocessor 202 in the instruction fetch stage (IF1) of processor 201.

In switching from time period 1 to time period 2, control circuit 205 in processor 201 advances from (IF1) to (DP1) and accordingly opens instruction register 112 of processor 201. In the same way, control circuit 210 in coprocessor 202 advances from (IF1) to (DE1) and accordingly opens instruction register 119 of coprocessor 202.

In time period 2, in the instruction decoding stage (DP1), decoder 204 in processor 201 receives the instruction after instruction register 112 is opened and then decodes the instruction. Then, control circuit 205 uses the micro instructions output by decoder 204 and, by opening driver 122, has the data in general register 106 placed onto data processing unit input bus 124.

In the instruction decoding stage (DE1) of coprocessor 202, decoder 209 in coprocessor 202 receives the instruction after instruction register 119 is opened and then decodes the instruction.

In switching from time period 2 to time period 3, control circuit 205 in processor 201, in advancing from pipeline stage (DP1) to (EXP1), opens micro instruction register 113 and data latch 114. As a result, micro instructions are transmitted via opened micro instruction register 113 from decoder 204 to control circuit 205, so that by means of control circuit 205 in processor 201 executing pipeline processing, operands are transmitted to data processing unit 207 in processor 201 from data processing unit input bus 124. Here, co-processor data latch 118 is opened so that operands are transmitted to coprocessor 202 from data processing unit input bus 124. Similarly, control circuit 210 in coprocessor 202, in advancing from pipeline stage (DE1) to (EXE1), opens micro instruction register 120. Once micro instruction register 113 in processor 201 has been opened, control circuit 205 in processor 201 receives the micro instructions decoded by decoder 204 in the instruction decoding stage (DP1). Similarly, once micro instruction register 120 has been opened, control circuit 210 in coprocessor 202 receives the micro instructions decoded by decoder 209 in the instruction decoding stage (DE1).

In time period 3, in the execution stage (EXP1) of processor 201, data processing unit 207 in processor 201 does not execute data processing (NOP).

In the instruction execution stage (EXE1) of coprocessor 202, control circuit 210 in coprocessor 202 opens driver 250 so that one 32-bit operand is transmitted on data processing unit input bus 124 to coprocessor processing unit 211 in coprocessor 202 and opens driver 253 so that one operand in data processing unit input buffer 230 is transmitted to coprocessor processing unit 211. Coprocessor processing unit 211 then performs processing using the operand from data processing unit input bus 124 and the operand from data processing unit input buffer 230 and outputs two pieces of data as its processing result. Control circuit 210 in coprocessor 202 then opens driver 254 in coprocessor 202 and has one of the processing results of coprocessor processing unit 211 transmitted on data processing unit output bus 125 which transmits the processing result to processor 201. Control circuit 210 in coprocessor 202 also opens driver 255 in coprocessor 202 and has the other processing result of coprocessor processing unit 211 transmitted to data processing unit output buffer 231 where the processing result is stored.

In switching from time period 3 to time period 4, control circuit 205 in processor 201 opens register write buffer 116 in switching pipeline processes from (EXP1) to (WB1) and, as a result, one of the processing results is transmitted from data processing unit output bus 125 to general register 106 in processor 201 via the opened register write buffer 116.

In time period 4, general register 106 in processor 201 stores one part of the processing result data.

(2.3) Operation Reading Data from Data Processing Unit Output Buffer 231 and Storing in General Register 106

Figure 7:
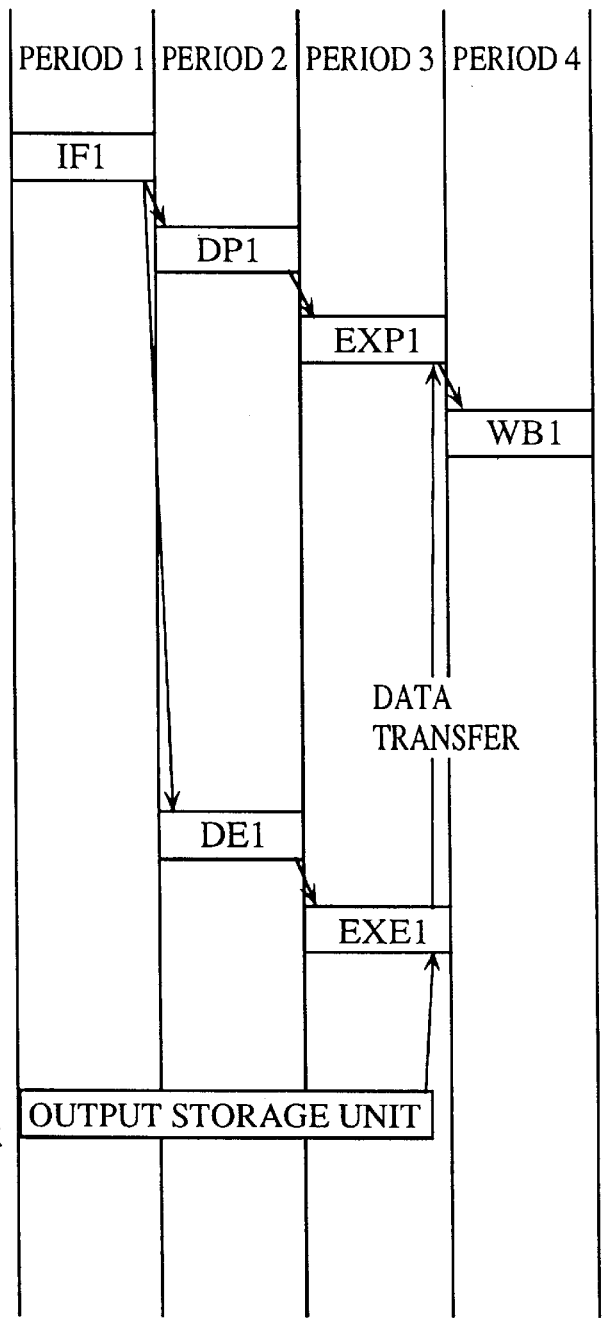
FIG. 7 is a time chart showing the states of pipeline processing of the instruction which writes the data stored in data processing unit output buffer 231 into general register 106 of the main processor, for the information processing device of the same embodiment.

FIG. 7 is a time chart showing the states of pipeline processing of the operation which writes the data stored in data processing unit output buffer 231 into general register 106 of processor 201.

In time period 1, memory 103 outputs the instruction onto instruction supply bus 126 which leads to processor 201 and coprocessor 202 in the instruction fetch stage (IF1) of processor 201.

In switching from time period 1 to time period 2, control circuit 205 in processor 201 advances from (IF1) to (DP1) and accordingly opens instruction register 112 of processor 201. In the same way, control circuit 210 in coprocessor 202 advances from (IF1) to (DE1) and accordingly opens instruction register 119 of coprocessor 202.

In time period 2, in the instruction decoding stage (DP1), decoder 204 in processor 201 receives the instruction after instruction register 112 is opened and then decodes the instruction.

In the instruction decoding stage (DE1) of coprocessor 202, decoder 209 in coprocessor 202 receives the instruction after instruction register 119 is opened and then decodes the instruction.

In switching from time period 2 to time period 3, control circuit 205 in processor 201, in advancing from pipeline stage (DP1) to (EXP1), opens micro instruction register 113, and data latch 114. As a result, micro instructions are transmitted via opened micro instruction register 113 from decoder 204 to control circuit 205, so that by means of control circuit 205 in processor 201 executing pipeline processing, data latch 114 is opened so that operands are transmitted to data processing unit 207 in processor 201 from data processing unit input bus 124. Similarly, control circuit 210 in coprocessor 202, in advancing from pipeline stage (DE1) to (EXE1), opens micro instruction register 120. Once micro instruction register 113 in processor 201 has been opened, control circuit 205 in processor 201 receives the micro instructions decoded by decoder 204 in the instruction decoding stage (DP1). Similarly, once micro instruction register 120 has been opened, control circuit 210 in coprocessor 202 receives the micro instructions decoded by decoder 209 in the instruction decoding stage (DE1).

In time period 3, in the execution stage (EXP1) of processor 201, data processing unit 207 in processor 201 does not execute data processing (NOP).

In the instruction execution stage (EXE1) of coprocessor 202, control circuit 210 in coprocessor 202 opens driver 257 so that the processing result data stored in data processing unit output buffer 231 is transmitted on data processing unit output bus 125.

In switching from time period 3 to time period 4, control circuit 205 in processor 201 opens register write buffer 116 in switching pipeline processes from (EXP1) to (WB1) and, as a result, the processing result is transmitted from data processing unit output bus 125 to general register 106 in processor 201 via the opened register write buffer 116.

In time period 4, general register 106 in processor 201 stores one part of the processing result data.

By equipping coprocessor 202 with these kinds of buffers, the coprocessor can be made to process a plurality of operands without increasing the power consumption or the cost due to increased chip size.

Figure 8:
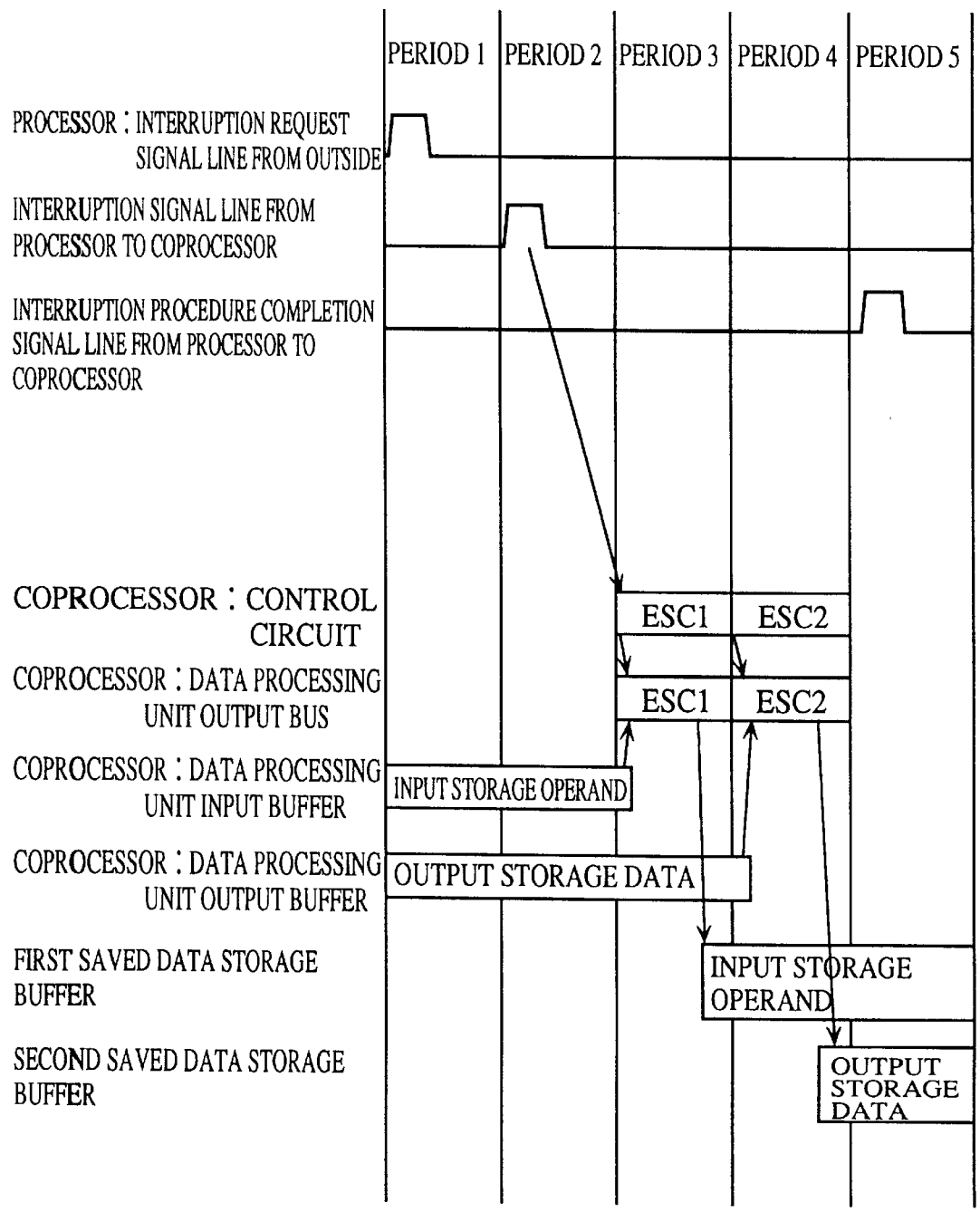
FIG. 8 is a time chart showing the occurrence of an interruption to main processor 201 and the operation saving the data in data processing unit input buffer 230 of the coprocessor and the data in data processing unit output buffer 231 of the coprocessor in saved data storage buffer 232 for the information processing device of the second embodiment of the present invention.

(2.4) Operation Saving Data in Data Processing Unit Input Buffer 230 and Data Processing Unit Output Buffer 231 at the Start of an Interruption Process FIG. 8 is a time chart showing the occurrence of an interruption to processor 201 and the operation saving the data in data processing unit input buffer 230 of coprocessor 202 and the data in data processing unit output buffer 231 of coprocessor 202 in saved data storage buffer 232. In this time chart, the legend "ESC1" shows the execution of the instruction saving the data in data processing unit input buffer 230 of coprocessor 202 and the legend "ESC2" shows the execution of the instruction saving the data in data processing unit output buffer 231 of coprocessor 202.

In time period 1, processor 201 receives an interruption request signal from outside the device on interruption request signal line 240.

In time period 2, control circuit 205 in processor 201 transmits an interruption signal on interruption signal line 241 to coprocessor 202. Control circuit 210 in coprocessor 202 then receives this signal sent on interruption signal line 241.

In time period 3, control circuit 210 in coprocessor 202 opens driver 258 and so has the processing result in data processing unit input buffer 230 transmitted on data processing unit output bus 125. Saved data storage buffer 232 then receives this data on data processing unit output bus 125 and renews its stored content.

In time period 4, control circuit 210 in coprocessor 202 opens driver 257 and so has the processing result in data processing unit output buffer 231 transmitted on data processing unit output bus 125. Saved data storage buffer 232 then receives this data on data processing unit output bus 125 and stores it.

In time period 5, control circuit 210 in coprocessor 202 transmits an interruption preparation completion signal to processor 201 via completion signal line 242, thereby giving processor 201 permission to start the interruption process.

2.5 Data Return Process after Completion of Interruption Process for Data Processing Unit Input Buffer 230 and Data Processing Unit Output Buffer 231

Figure 9:
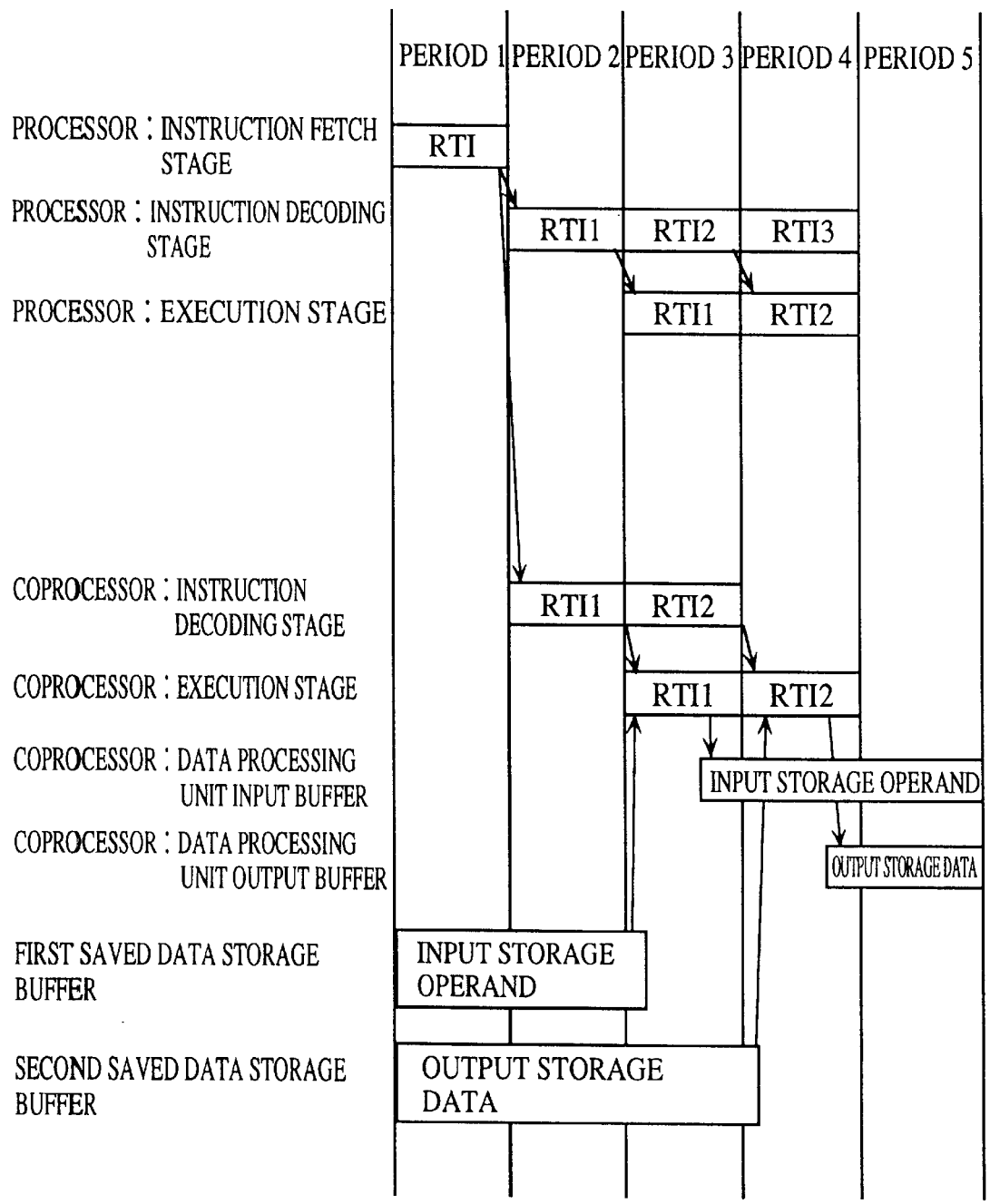
FIG. 9 is a time chart showing the states of the pipeline processing of the interruption return instruction for the information processing device of the second embodiment of the present invention.

FIG. 9 is a time chart showing the states of the pipeline processing of the interruption return instruction. In this time chart, the legend "RTI1" shows the data return process by processor 201 and coprocessor 202 for data processing unit input buffer 230, while the legend "RTI2" shows the data return process by processor 201 and coprocessor 202 for data processing unit output buffer 231.

The following is an explanation of the operation by coprocessor 202 for an interruption return instruction with reference to the time chart in FIG. 9 showing the states of the pipeline processing of the interruption return instruction.

In time period 1, memory 103 outputs the interruption return instruction onto instruction supply bus 126 which leads to processor 201 and coprocessor 202 in the instruction fetch stage of processor 201.

In switching from time period 1 to time period 2, control circuit 205 in processor 201 advances from (IF1) to (DP1) and accordingly opens instruction register 112 of processor 201. In the same way, control circuit 210 in coprocessor 202 advances from (IF1) to (DE1) and accordingly opens instruction register 119 of coprocessor 202.

In time period 2, in the instruction decoding stage (DP1) of processor 201, decoder 204 in processor 201 receives the fetched interruption return instruction after instruction register 112 is opened and then decodes the instruction. Similarly, in the instruction decoding stage (DE1) of coprocessor 202, decoder 209 in coprocessor 202 receives the interruption return instruction after instruction register 119 is opened and then decodes the instruction.

In switching from time period 2 to time period 3, control circuit 205 in processor 201, in the (RTI1) process, opens micro instruction register 113 and data latch 114. As a result, interruption return micro instructions are transmitted via opened micro instruction register 113 from decoder 204 to control circuit 205. Similarly, control circuit 210 in coprocessor 202, in advancing to pipeline stage (RTI1), opens micro instruction register 120. Once micro instruction register 113 in processor 201 has been opened, control circuit 205 in processor 201 receives the micro instructions decoded from the (RTI1) instruction by decoder 204 in the instruction decoding stage (DP1). Similarly, once micro instruction register 120 has been opened, control circuit 210 in coprocessor 202 receives the micro instructions decoded from the (RTI1) instruction by decoder 209 in the instruction decoding stage (DE1).

In time period 3, in the instruction decoding stage (RTI2) of processor 201, interruption return micro instructions are repeatedly output.

In the instruction execution stage (RTI1) of processor 201, processor 201 executes a return process.

In the instruction decoding stage (RTI2) of coprocessor 202, interruption return micro instructions are repeatedly output.

In the instruction execution stage (RTI2) of coprocessor 202, driver 259 is opened and saved data storage buffer 232 places its data onto data processing unit input bus 124 which leads to processor 201 and coprocessor 202. Control circuit 210 in coprocessor 202 then opens driver 256 in coprocessor 202 which sends the data on data processing unit input bus 124 to data processing unit input buffer 230 in coprocessor 202. Data processing unit input buffer 230 then stores the data received from data processing unit input bus 124.

In time period 4, interruption return micro instructions are repeatedly output as the instruction decoding stage (RTI3) of processor 201.

In the instruction execution stage (RTI2) of processor 201, processor 201 executes a return process.

In the instruction execution stage (RTI2) of coprocessor 202, driver 259 is opened and saved data storage buffer 232 places its data onto data processing unit input bus 124 which leads to processor 201 and coprocessor 202. Control circuit 210 in coprocessor 202 then opens driver 256 in coprocessor 202 which sends the data on data processing unit input bus 124 to data processing unit output buffer 231 in coprocessor 202. Data processing unit output buffer 231 then stores the data received from data processing unit input bus 124.

Third Embodiment

Figure 10:
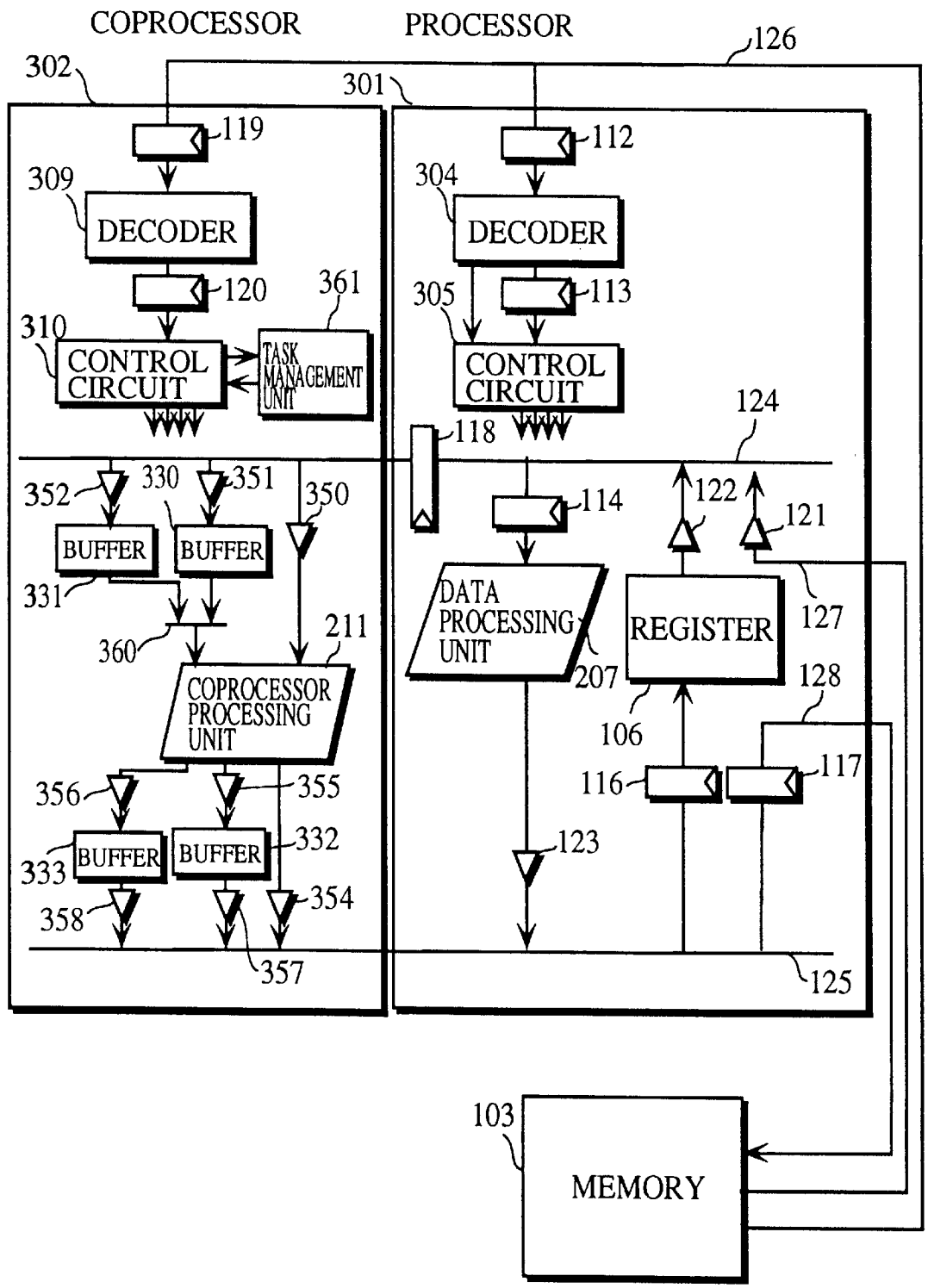
FIG. 10 is a block diagram showing the construction of the information processing device of the third embodiment of the present invention.

FIG. 10 is a block diagram showing the construction of the information processing device of the third embodiment of the present invention. This information processing device can be seen to be composed of processor 301, coprocessor 302 and memory 303. Note here that construction elements which are the same as those in the second embodiment shown in FIG. 4 have been given the same reference numerals and their explanation has been omitted, so that the following explanation will focus on the differences with the second embodiment.

In the present embodiment, processor 301 is equipped with the functions of processor 201 in the second embodiment, but differs in having a function for switching tasks. Here, task switching for processor 301 refers to the execution of a task switching process achieved by executing a task switching instruction. This task switching by processor 301 may be achieved according to a common technique. Also, in the present embodiment, data processing unit output bus 125 may be constructed in the same way as the second embodiment from one 32-bit bus.

Coprocessor 302 includes data processing unit input buffers 330 and 331, data processing unit output buffers 332 and 333 and the surrounding drivers in place of data processing unit input buffer 230, data processing unit output buffer 231 and the surrounding drivers of the second embodiment, as well as additionally including task management unit 361.

Decoder 304 in processor 301 is equipped with the functions of decoder 204 in the second embodiment, but differs in having a function for decoding task switching instructions and for issuing micro instructions for switching tasks as specified by the instruction in question.

Control circuit 305 in processor 301 is equipped with the functions of control circuit 205 in the second embodiment, but differs in having a function outputting a variety of control signals corresponding to received micro instructions for realizing a switching of tasks.

Decoder 309 in coprocessor 302 is equipped with the functions of decoder 209 in the second embodiment, but differs in having a function for decoding task switching instructions. More specifically, when the decoding result shows that an instruction is a task switching instruction, decoder 309 issues a micro instruction storing a task number indicated by the decoded instruction into task management unit 361.

Data processing unit 207 of processor 301 executes the main data processing for processor 301.

Control circuit 310 in coprocessor 302 is equipped with the functions of control circuit 210 in the second embodiment, but differs in having a function for outputting control signals, on receiving micro instructions which are the decoding result of a task switching instruction, for storing a task number specified by the instruction into task management unit 361. Also, on receiving micro instructions which are the decoding result of a coprocessor transfer instruction as explained in the second embodiment, control circuit 310 selectively uses one of data processing unit input buffer 330 and data processing unit input buffer 331 according to the task number stored in task management unit 361. For example, when the task number stored in task management unit 361 is 1, control circuit 310 executes control so that data processing unit input buffer 330 and data processing unit output buffer 332 are used, while when the task number is 2, control circuit 310 executes control so that data processing unit input buffer 331 and data processing unit output buffer 333 are used. As another example, when a coprocessor instruction is for the execution of a three-item calculation, data processing unit input buffer 330 and data processing unit input buffer 331 are used selectively, with, when the execution of the coprocessor instruction generates a plurality of pieces of data as a calculation result, data processing unit output buffer 332 and data processing unit output buffer 333 being used selectively according to the task number.

Data processing unit input buffer 330 and data processing unit input buffer 331 are buffers for storing data sent on data processing unit input bus 124 when coprocessor processing unit 211 executes processing using a plurality of operands. Here, data processing unit input buffer 330 and data processing unit input buffer 331 are selected according to the task number in task management unit 361.

Data processing unit output buffer 332 and data processing unit output buffer 333 are buffers for storing the data to be sent on data processing unit output bus 125 when a number of pieces of data are generated as the calculation result of coprocessor processing unit 211. Here, data processing unit output buffer 332 and data processing unit output buffer 333 are selected according to the task number in task management unit 361.

Driver 350 is a driver which is opened according to control by control circuit 305 and which is used to transmit data from data processing unit input bus 124 to coprocessor processing unit 211.

Driver 351 is a driver which is opened according to control by control circuit 305 and which is used to transmit data from data processing unit input bus 124 to data processing unit input buffer 330.

Driver 352 is a driver which is opened according to control by control circuit 305 and which is used to transmit data from data processing unit input bus 124 to data processing unit input buffer 331.

Driver 354 is a driver which is opened according to control by control circuit 305 and which is used to transmit data from coprocessor processing unit 211 on data processing unit output bus 125.

Driver 355 is a driver which is opened according to control by control circuit 305 and which is used to transmit data from coprocessor processing unit 211 to data processing unit output buffer 332.

Driver 356 is a driver which is opened according to control by control circuit 305 and which is used to transmit data from coprocessor processing unit 211 to data processing unit output buffer 333.

Driver 357 is a driver which is opened according to control by control circuit 305 and which is used to transmit data from data processing unit output buffer 332 on data processing unit output bus 125.

Driver 358 is a driver which is opened according to control by control circuit 305 and transmits data from data processing unit output buffer 333 on data processing unit output bus 125.

Selector 360 is controlled by control circuit 305 so as to select data processing unit input buffer 330 or data processing unit input buffer 331.

Task management unit 361 is controlled by control circuit 305 so as to store a task number and to transmit this task number to control circuit 305. The task number stored by task management unit 361 is set at task 1 or task 2, with, when the task number is task 1, data processing unit input buffer 330 and data processing unit output buffer 332 being selected, and when the task number is task 2, data processing unit input buffer 331 and data processing unit output buffer 333 being selected.

The following is an explanation of the operation of the information processing device of the third embodiment of the present invention which is constructed as described above, with the explanation being divided into (3.1) the execution operation of a task switching operation, (3.2) the operation for a coprocessor transfer instruction in which the data stored in general register 106 is written into a data processing unit input buffer of coprocessor 302, (3.3) the operation of a coprocessor instruction which performs a calculation using the data in general register 106 of processor 301 and the data in a data processing unit input buffer before writing the output result in general register 106 and in a data processing unit output buffer, and (3.4) operation for a coprocessor transfer instruction which writes data in a data processing unit output buffer of coprocessor 302 into general register 106 of processor 301.

(3.1) Operation executing a task switching operation in coprocessor 302

During the instruction fetch stage, memory 103 places a task switching instruction onto instruction supply bus 126. In the instruction decoding stage, control circuit 310 opens instruction register 119. Once instruction register 119 has been opened, decoder 309 decodes the task switching instruction. In switching between pipeline stages, control circuit 310 in coprocessor 302 opens micro instruction register 120. Once micro instruction register 120 has been opened, control circuit 310 receives the micro instruction decoded by decoder 309 and, together with executing control of task switching, stores the task number specified by the original instruction in the task management unit 361. When coprocessor transfer instructions and coprocessor instructions which are calculations using three or more items are executed, data processing unit input buffer 330 and data processing unit output buffer 332 are selected when the task number is task 1, while data processing unit input buffer 331 and data processing unit output buffer 333 being selected when the task number is task 2.

(3.2) Operation for a Coprocessor Transfer Instruction in which Data Stored in General Register 106 is written into a Data Processing Unit Input Buffer of Coprocessor 302

The following is an explanation of the operation inside coprocessor 302 when the task number task 1 is stored in task management unit 361 and data stored in general register 106 is written into data processing unit input buffer 330. The present operation uses the same timing as the states in the time chart for pipeline processing shown in FIG. 5, so that the following explanation will also refer to FIG. 5.

In time period 1, memory 103 outputs the instruction onto instruction supply bus 126 which leads to processor 301 and coprocessor 302 in the instruction fetch stage of processor 301.

In switching from time period 1 to time period 2, control circuit 305 in processor 301 advances from (IF1) to (DP1) and accordingly opens instruction register 112 of processor 301. In the same way, control circuit 310 in coprocessor 302 advances from (IF1) to (DE1) and accordingly opens instruction register 119 of coprocessor 202.

In time period 2, in the instruction decoding stage (DP1) of processor 301, decoder 304 in processor 301 receives the fetched instruction after instruction register 112 is opened and then decodes the instruction. Then, control circuit 305 uses the micro instructions output by decoder 304 and, by opening driver 122, has the operand in general register 106 placed onto data processing unit input bus 124.

In the instruction decoding stage (DE1) of coprocessor 302, decoder 309 in coprocessor 302 receives the instruction after instruction register 119 is opened and then decodes the instruction.

In switching from time period 2 to time period 3, control circuit 305 in processor 301, in advancing from pipeline stage (DP1) to (EXP1), opens micro instruction register 113, data latch 114 and coprocessor data latch 118. As a result, micro instructions are transmitted from decoder 304 to control circuit 305, so that by means of control circuit 305 in processor 301 executing pipeline processing, operands are transmitted to data processing unit 207 in processor 301 from data processing unit input bus 124 the operands are then transmitted to coprocessor 302 from data processing unit input bus 124. Similarly, control circuit 310 in coprocessor 302, in advancing from pipeline stage (DE1) to (EXE1), opens micro instruction register 120. Once micro instruction register 113 in processor 301 has been opened, control circuit 305 in processor 301 receives the micro instructions decoded by decoder 304 in the instruction decoding stage (DP1). Similarly, once micro instruction register 120 has been opened, control circuit 310 in coprocessor 302 receives the micro instructions decoded by decoder 309 in the instruction decoding stage (DE1).

In time period 3, in the execution stage (EXP1) of processor 301, data processing unit 207 in processor 301 does not execute data processing (NOP).

In the instruction execution stage (EXE1) of coprocessor 302, control circuit 310 in coprocessor 302 opens driver 351 which transmits one 32-bit operand on data processing unit input bus 124 to data processing unit input buffer 330 in coprocessor 302. This operand is then stored in data processing unit input buffer 330.

(3.3) Operation of coprocessor instruction calculating using data in general register 106 and data in a data processing unit input buffer before writing result in general register 106 and in a data processing unit output buffer The following is an explanation of when task 1 is stored by task management unit 361 in coprocessor 302, so that the data stored in general register 106 of processor 301 and data stored in data processing unit input buffer 330 are used in calculation and the calculation results are written into general register 106 and data processing unit output buffer 332. The present operation uses the same timing as the states in the time chart for pipeline processing shown in FIG. 6, so that the following explanation will also refer to FIG. 6.

In time period 1, memory 103 outputs the instruction onto instruction supply bus 126 which leads to processor 301 and coprocessor 302 in the instruction fetch stage (IF1) of processor 301.

In switching from time period 1 to time period 2, control circuit 305 in processor 301 advances from (IF1) to (DP1) and accordingly opens instruction register 112 of processor 301. In the same way, control circuit 310 in coprocessor 302 advances from (IF1) to (DE1) and accordingly opens instruction register 119 of coprocessor 302.

In time period 2, in the instruction decoding stage (DP1), decoder 304 in processor 301 receives the instruction after instruction register 112 is opened and then decodes the instruction. Then, control circuit 305 uses the micro instructions output by decoder 304 and, by opening driver 122, has the data in general register 106 placed onto data processing unit input bus 124.

In the instruction decoding stage (DE1) of coprocessor 302, decoder 309 in coprocessor 302 receives the instruction after instruction register 119 is opened and then decodes the instruction.

In switching from time period 2 to time period 3, control circuit 305 in processor 301, in advancing from pipeline stage (DP1) to (EXP1), opens micro instruction register 113, data latch 114 and coprocessor data latch 118. As a result, micro instructions are transmitted via micro instruction register 113 from decoder 304 to control circuit 305, so that by means of control circuit 305 in processor 301 executing pipeline processing, operands are transmitted to data processing unit 207 in processor 301 from data processing unit input bus 124 and the operands are transmitted to coprocessor 302 from data processing unit input bus 124. Similarly, control circuit 310 in coprocessor 302, in advancing from pipeline stage (DE1) to (EXE1), opens micro instruction register 120. Once micro instruction register 113 in processor 301 has been opened, control circuit 305 in processor 301 receives the micro instructions decoded by decoder 304 in the instruction decoding stage (DP1). Similarly, once micro instruction register 120 has been opened, control circuit 310 in coprocessor 302 receives the micro instructions decoded by decoder 309 in the instruction decoding stage (DE1).

In time period 3, in the execution stage (EXP1) of processor 301, data processing unit 207 in processor 301 does not execute data processing (NOP).

In the instruction execution stage (EXE1) of coprocessor 302, "task 1", stored as task information in task management unit 361, is output to control circuit 310 of coprocessor 302.

Control circuit 310 in coprocessor 302 opens driver 350 so that one operand is transmitted on data processing unit input bus 124 to coprocessor processing unit 211 in coprocessor 302, with selector 360 in coprocessor 302 selecting data processing unit input buffer 330 in accordance with the task information "task 1" output by task management unit 361 so that one operand is transmitted from data processing unit input buffer 330 to coprocessor processing unit 211. Coprocessor processing unit 211 then performs processing using the operands from data processing unit input bus 124 and the operand from data from data processing unit input buffer 330 and outputs two pieces of data as its processing result. Control circuit 310 in coprocessor 302 then opens driver 354 in coprocessor 302 and has one of the pieces of processing result data of coprocessor processing unit 211 transmitted on data processing unit output bus 125 to processor 301. Control circuit 310 in coprocessor 302 also opens driver 255 in coprocessor 302 in accordance with the task information "task 1" and so has the other piece of processing result data of coprocessor processing unit 211 transmitted to data processing unit output buffer 332, where the processing result is then stored.

In switching from time period 3 to time period 4, control circuit 305 in processor 301 opens register write buffer 116 in switching pipeline processes from (EXP1) to (WB1) and, as a result, one of the processing results is transmitted from data processing unit output bus 125 to general register 106 in processor 301 via the opened register write buffer 116.

In time period 4, general register 106 in processor 201 stores one part of the processing result data.

(3.4) Operation for Coprocessor Transfer Instruction which Writes Data in a Data Processing Unit Output Buffer of Coprocessor 302 into General Register 106 of Processor 301

The following is an explanation of the operation for a coprocessor transfer instruction which writes data stored in data processing unit output buffer 333 into general register 106 of processor 301 when task management unit 361 is storing the task information "task 2". The present operation uses the same timing as the states in the time chart for pipeline processing shown in FIG. 7, so that the following explanation will also refer to FIG. 7.

In time period 1, memory 103 outputs the instruction onto instruction supply bus 126 which leads to processor 301 and coprocessor 302 in the instruction fetch stage (IF1) of processor 301.

In switching from time period 1 to time period 2, control circuit 305 in processor 301 advances from (IF1) to (DP1). and accordingly opens instruction register 112 of processor 301. In the same way, control circuit 310 in coprocessor 302 advances from (IF1) to (DE1) and accordingly opens instruction register 119 of coprocessor 302.

In time period 2, in the instruction decoding stage (DP1), decoder 304 in processor 301 receives the instruction after instruction register 112 is opened and then decodes the instruction.

In the instruction decoding stage (DE1) of coprocessor 302, decoder 309 in coprocessor 302 receives the instruction after instruction register 119 is opened and then decodes the instruction.

In switching from time period 2 to time period 3, control circuit 305 in processor 301, in advancing from pipeline stage (DP1) to (EXP1), opens micro instruction register 113, and data latch 114. As a result, micro instructions are transmitted via opened micro instruction register 113 from decoder 304 to control circuit 305, so that by means of control circuit 305 in processor 301 executing pipeline processing, data latch 114 is opened and operands are transmitted to data processing unit 207 in processor 301 from data processing unit input bus 124. Similarly, control circuit 310 in coprocessor 302, in advancing from pipeline stage (DE1) to (EXE1), opens micro instruction register 120. Once micro instruction register 113 in processor 301 has been opened, control circuit 305 in processor 301 receives the micro instructions decoded by decoder 304 in the instruction decoding stage (DP1). Similarly, once micro instruction register 120 has been opened, control circuit 310 in coprocessor 302 receives the micro instructions decoded by decoder 309 in the instruction decoding stage (DE1).

In time period 3, in the execution stage (EXP1) of processor 301, data processing unit 207 in processor 301 does not execute data processing (NOP).

In the instruction execution stage (EXE1) of coprocessor 302, "task 2", stored as task information in task management unit 361, is output to control circuit 310 of coprocessor 310.

Control circuit 310 in coprocessor 302 opens driver 258 in accordance with "task 2" output by task management unit 361 so that the processing result data stored in data processing unit output buffer 333 is transmitted on data processing unit output bus 125.

In switching from time period 3 to time period 4, control circuit 305 in processor 301 opens register write buffer 116 in switching pipeline processes from (EXP1) to (WB1) and, as a result, the processing result is transmitted from data processing unit output bus 125 to general register 106 in processor 301 via opened register write buffer 116.

In time period 4, general register 106 in processor 201 stores one part of the processing result data.

It should be noted here that although control circuit 310 controls the switching of tasks by task management unit 361 in the present embodiment, it is also possible for task switching to be performed by providing the device with a task switching signal line from outside the device so that task switching can be controlled from outside by means of a task switching signal.

Similarly, while the first to third embodiments describe a case when registers are specified as operand data for coprocessor instructions, the same operation can be achieved when memory locations are specified as operand data. In such a case the processor must perform memory access, which means that execution speed is no better than conventional techniques, although it becomes no longer necessary to equip the coprocessor with a circuit for controlling memory access, so that the scale of the circuit, and therefore the cost, is smaller than conventional circuits.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information processing device which includes a main processor and a coprocessor which process data according to an instruction stored in a memory, said information processing device comprising:

an instruction bus used for transmitting the instruction from the memory to the main processor and to the coprocessor;

a first bus, substantially directly connected to an output of a register set in the main processor and to an input of a processing unit in the coprocessor, used for transmitting data from the main processor to the coprocessor;

a second bus, connected to an output of the processing unit in the coprocessor and substantially directly connected to an input of the register set in the main processor, used for transmitting data from the coprocessor to the main processor;

instruction detecting means, installed in the main processor, for detecting a coprocessor calculation instruction which is an instruction which should be executed by the coprocessor, out of all the instructions received from the memory via the instruction bus;

operand identifying means, installed in the main processor, for identifying a source register in the register set and a destination register in the register set specified by operands in the instruction detected by the instruction detecting means;

data supplying means, installed in the main processor, for supplying data from the identified source register to the coprocessor via the first bus;

data storing means, installed in the main processor, for storing a calculation result supplied from the coprocessor via the second bus in the identified destination register;

coprocessor instruction detecting means, installed in the coprocessor, for detecting, at a same time interval as the instruction detecting means, the coprocessor calculation instruction out of all the instructions received from the memory via the instruction bus; and coprocessor instruction executing means, installed in the coprocessor, for executing the coprocessor calculation instruction detected by the coprocessor instruction detecting means using the data supplied via the first bus and for supplying the calculation result on the second bus.

2. The information processing device of claim 1, wherein the coprocessor includes an input buffer for temporarily storing the data sent on the first bus, and the instruction detecting means detects a first transfer instruction indicating data transfer from the main processor to the coprocessor, the operand identifying means identifies source registers specified by operands of the detected first transfer instruction, the data supplying means outputs data in the identified source register for the first transfer instruction on the first bus, the coprocessor instruction detecting means, on detecting the first transfer instruction, stores the data on the first bus in the input buffer, and the coprocessor instruction executing means uses the data in the input buffer in executing coprocessor calculation instructions which require at least three operands.

3. The information processing device of claim 2, further comprising:

a saving buffer which has an area for storing data;

saving means, installed in the coprocessor, for saving the data in the input buffer in the saving buffer on receiving an interruption signal; and returning means, installed in the coprocessor, for returning the data in the saving buffer to the input buffer on detecting an instruction for a return from an interruption, wherein the main processor outputs an interruption signal to the saving means on receiving an interruption request, and the coprocessor instruction detecting means notifies the returning means on detecting an instruction for the return from an interruption.

4. The information processing device of claim 2, wherein the coprocessor further includes an output buffer for storing a part of the calculation result of the coprocessor instruction executing means which is the data on the second bus, the coprocessor instruction detecting means, on detecting a second transfer instruction indicating data transfer from the coprocessor to the main processor, has data in the output buffer which is a part of the calculation result of the coprocessor instruction executing means output on the second bus, the instruction detecting means detects the second transfer instruction, the operand identifying means identifies registers specified as destinations in operands of the second transfer instruction and the data storing means stores data from the second bus in the identified registers.

5. The information processing device of claim 4, further comprising:

a saving buffer which has an area for storing data;

saving means, installed in the coprocessor, for saving the data in the input buffer and in the output buffer into the saving buffer on receiving an interruption signal;

returning means, installed in the coprocessor, for returning the data in the saving buffer to the input buffer and to the output buffer on detecting an instruction for a return from an interruption, wherein the main processor outputs an interruption signal to the saving means on receiving an interruption request, and the coprocessor instruction detecting means notifies the returning means on detecting an instruction for the return from an interruption.

6. The information processing device of claim 4, wherein the coprocessor instruction detecting means detects an instruction to perform task switching in accordance with a task number which identifies a task, the input buffer and the output buffer include a plurality of pairs of storage areas, and the coprocessor further includes task management means for allowing data input and output for one pair of storage areas which corresponds to the task number in the detected task switching instruction and for prohibiting data input and output for all other pairs of storage areas.

7. The information processing device of claim 1, further comprising:

main processor stage status management means for managing a number of cycles in an instruction execution stage of the main processor so as to equal a number of execution cycles of the coprocessor instruction executing means, wherein the main processor executes pipeline processing which includes at least an instruction fetch stage, an instruction decoding stage and the instruction execution stage and the coprocessor operates in synchronization with the main processor.

8. The information processing device of claim 7, wherein the coprocessor instruction executing means, on reaching a final cycle during an execution of the coprocessor instruction, notifies the main processor stage status management means of an end of coprocessor instruction execution and the main processor stage status management means, on receiving a notification of the end of coprocessor instruction execution, terminates the instruction execution stage during an execution cycle in which the notification is received.

9. The information processing device of claim 7, further comprising main processor determining means for determining a number of cycles in the execution stage of a main processor in accordance with a kind of coprocessor calculation instruction detected by the instruction detecting means, wherein the main processor stage status management means has the instruction execution stage continued for the number of cycles determined by the main processor determining means.

10. The information processing device of claim 7, wherein the coprocessor includes an input buffer for temporarily storing the data sent on the first bus, and the instruction detecting means detects a first transfer instruction indicating data transfer from the main processor to the coprocessor, the operand identifying means identifies source registers specified by operands of the detected first transfer instruction, the data supplying means outputs data in the identified source register for the first transfer instruction on the first bus, the coprocessor instruction detecting means, on detecting the first transfer instruction, stores the data on the first bus in the input buffer, and the coprocessor instruction executing means uses the data in the input buffer in executing coprocessor calculation instructions which require at least three operands.

11. The information processing device of claim 10, further comprising:

a saving buffer which has an area for storing data;

saving means, installed in the coprocessor, for saving the data in the input buffer in the saving buffer on receiving an interruption signal; and returning means, installed in the coprocessor, for returning the data in the saving buffer to the input buffer on detecting an instruction for a return from an interruption, wherein the main processor outputs an interruption signal to the saving means on receiving an interruption request, and the coprocessor instruction detecting means notifies the returning means on detecting an instruction for the return from an interruption.

12. The information processing device of claim 10, wherein the coprocessor further includes an output buffer for storing a part of the calculation result of the coprocessor instruction executing means which is the data on the second bus, the coprocessor instruction detecting means, on detecting a second transfer instruction indicating data transfer from the coprocessor to the main processor, has data in the output buffer which is a part of the calculation result of the coprocessor instruction executing means output on the second bus, the instruction detecting means detects the second transfer instruction, the operand identifying means identifies registers specified as destinations in operands of the second transfer instruction and the data storing means stores data from the second bus in the identified registers.

13. The information processing device of claim 12, further comprising:

a saving buffer which has an area for storing data;

saving means, installed in the coprocessor, for saving the data in the input buffer and in the output buffer into the saving buffer on receiving an interruption signal;

returning means, installed in the coprocessor, for returning the data in the saving buffer to the input buffer and to the output buffer on detecting an instruction for a return from an interruption, wherein the main processor outputs an interruption signal to the saving means on receiving an interruption request, and the coprocessor instruction detecting means notifies the returning means on detecting an instruction for the return from an interruption.

14. The information processing device of claim 12, wherein the coprocessor instruction detecting means detects an instruction to perform task switching in accordance with a task number which identifies a task, the input buffer and the output buffer include a plurality of pairs of storage areas, and the coprocessor further includes task management means for allowing data input and output for one pair of storage areas which corresponds to the task number in the detected task switching instruction and for prohibiting data input and output for all other pairs of storage areas.

15. The information processing device of claim 1, further comprising:

a main processor flag register for storing a plurality of flags showing states of a calculation result;

a first flag bus used for transmitting flags supplied by the data supplying means to the coprocessor instruction executing means; and a second flag bus used for transmitting new flags from the coprocessor instruction executing means to the main processor flag register, wherein the data supplying means supplies flags in the main processor flag register to the coprocessor together with the data in the source registers, the data storing means stores the new flags transmitted from the coprocessor in the main processor flag register along with storing the calculation result in the destination registers, and the coprocessor instruction executing means executes the coprocessor calculation instruction using flags and data supplied by the data supplying means, before outputting a new flag showing a state of a calculation result to the data storing means.

16. The information processing device of claim 15, further comprising:

main processor stage status management means for managing a number of cycles in an instruction execution stage of the main processor so as to equal a number of execution cycles of the coprocessor instruction executing means, wherein the main processor executes pipeline processing which includes at least an instruction fetch stage, an instruction decoding stage and the instruction execution stage and the coprocessor operates in synchronization with the main processor.

17. The information processing device of claim 16, wherein the coprocessor instruction executing means, on reaching a final cycle during an execution of the coprocessor instruction, notifies the main processor stage status management means of an end of coprocessor instruction execution and the main processor stage status management means, on receiving a notification of the end of coprocessor instruction execution, terminates the instruction execution stage during an execution cycle in which the notification is received.

18. The information processing device of claim 16, further comprising main processor determining means for determining a number of cycles in the execution stage of a main processor in accordance with a kind of coprocessor calculation instruction detected by the instruction detecting means, wherein the main processor stage status management means has the instruction execution stage continued for the number of cycles determined by the main processor determining means.

19. The information processing device of claim 1, further comprising:

at least one coprocessor, with a coprocessor calculation instruction executed by each coprocessor being for a different type of calculation, wherein the instruction bus is used to transmit an instruction taken from the memory to the coprocessor instruction detecting means in every coprocessor, the first bus is used to transmit data supplied by the data supplying means to the coprocessor instruction executing means in each coprocessor, the second bus is used to transmit a calculation result of the coprocessor instruction executing means in a coprocessor which executed the coprocessor calculation instruction to the data storing means, and the instruction detecting means detects coprocessor instructions for each coprocessor.

20. The information processing device of claim 19, further comprising:

main processor stage status management means for managing a number of cycles in an instruction execution stage of the main processor so as to equal a number of execution cycles of the coprocessor instruction executing means of a coprocessor which executes a coprocessor instruction, wherein the main processor executes pipeline processing which includes at least an instruction fetch stage, an instruction decoding stage and the instruction execution stage and each coprocessor operates in synchronization with the main processor.

21. The information processing device of claim 20, wherein the coprocessor instruction executing means in a coprocessor which executes the coprocessor instruction, on reaching a final cycle during an execution of the coprocessor instruction, notifies the main processor stage status management means of an end of coprocessor instruction execution and the main processor stage status management means, on receiving a notification of the end of coprocessor instruction execution, terminates the instruction execution stage during an execution cycle in which the notification is received.

22. The information processing device of claim 20, further comprising main processor determining means for determining a number of cycles in the execution stage of a main processor in accordance with a kind of coprocessor calculation instruction detected by the instruction detecting means, wherein the main processor stage status management means has the instruction execution stage continued for the number of cycles determined by the main processor determining means.

23. A processing system having a main processor and a coprocessor, the system comprising:

an instruction bus which transmits an instruction from a memory to the main processor and to the coprocessor;

a first bus, substantially directly connected to an output of a register set in the main processor and to an input of a processing unit in the coprocessor, which transmits data from the main processor to the coprocessor;

a second bus, connected to an output of the processing unit in the coprocessor and substantially directly connected to an input of the register set in the main processor, which transmits data from the coprocessor to the main processor;

an instruction detector, installed in the main processor, which detects a coprocessor calculation instruction out of all the instructions received from the memory via the instruction bus;

an operand identifier, installed in the main processor, which identifies a source register in the register set and a destination register in the register set specified by operands in the instruction detected by the instruction detector;

a data supplier, installed in the main processor, which supplies data from the identified source register to the coprocessor via the first bus;

a data storage device, installed in the main processor, which stores a calculation result supplied from the coprocessor via the second bus in the identified destination register;

a coprocessor instruction detector, installed in the coprocessor, which detects, at a same time interval as the instruction detector, the coprocessor calculation instruction out of all the instructions received from the memory via the instruction bus; and a coprocessor instruction executor, installed in the coprocessor, which executes the coprocessor calculation instruction detected by the coprocessor instruction detector using the data supplied via the first bus and for supplying the calculation result on the second bus.

* * * * *